(12) United States Patent
Lucas et al.

(10) Patent No.: US 10,733,305 B2
(45) Date of Patent: Aug. 4, 2020

(54) SYSTEM AND METHOD FOR IMPLEMENTING CRYPTOGRAPHY IN A STORAGE SYSTEM

(71) Applicant: StorageOS Limited, Bicester (GB)

(72) Inventors: André Lucas, Berkshire (GB); Alex Chircop, Buckinghamshire (GB)

(73) Assignee: StorageOS Limited (GB)

( * ) Notice: Subject to any disclaimer, the term of this patent is extended or adjusted under 35 U.S.C. 154(b) by 342 days.

(21) Appl. No.: 15/814,357

(22) Filed: Nov. 15, 2017

(65) Prior Publication Data

US 2018/0137293 A1    May 17, 2018

Related U.S. Application Data

(60) Provisional application No. 62/422,376, filed on Nov. 15, 2016, provisional application No. 62/486,829, filed on Apr. 18, 2017.

(51) Int. Cl.
| | | |
|---|---|---|
| *G06F 11/30* | (2006.01) | |
| *G06F 12/14* | (2006.01) | |
| *G06F 21/60* | (2013.01) | |
| *H04L 9/08* | (2006.01) | |
| *H04L 9/14* | (2006.01) | |
| *G06F 21/62* | (2013.01) | |
| *H04L 9/32* | (2006.01) | |

(52) U.S. Cl.
CPC ........ *G06F 21/602* (2013.01); *G06F 21/6218* (2013.01); *H04L 9/0869* (2013.01); *H04L 9/0894* (2013.01); *H04L 9/14* (2013.01); *H04L 9/3226* (2013.01)

(58) Field of Classification Search
CPC . G06F 21/602; G06F 21/6218; H04L 9/3226; H04L 9/0894; H04L 9/14; H04L 9/0869
See application file for complete search history.

(56) References Cited

U.S. PATENT DOCUMENTS

| | | |
|---|---|---|
| 5,394,534 A | 2/1995 | Kulakowski et al. |
| 6,360,300 B1 | 3/2002 | Corcoran et al. |
| 2010/0250880 A1 | 9/2010 | Mimatsu |
| 2011/0022856 A1* | 1/2011 | Ureche ................ G06F 21/602 713/193 |
| 2011/0302398 A1* | 12/2011 | Ureche ................ H04L 9/0822 713/2 |
| 2012/0275596 A1* | 11/2012 | Ureche ................ H04L 9/002 380/47 |

(Continued)

OTHER PUBLICATIONS

Microsoft Corporation; "Understanding Disk Terminology", Jun. 10, 2014; https://msdn.microsoft.com/en-us/library/dd163557(d=printer).aspx, Retrieved on Nov. 3, 2017; 2 pgs.

*Primary Examiner* — Trong H Nguyen
(74) *Attorney, Agent, or Firm* — Loza & Loza, LLP

(57) ABSTRACT

A method for performing cryptography operations on data blocks within a volume of data is disclosed. The method involves generating a volume master key, generating a user key, generating a volume initialization vector, generating an intermediate key, generating a user volume key, and performing cryptography operations on data blocks within an individual volume of data using the volume master key, the user key, the volume initialization vector, the intermediate key, and the user volume key.

11 Claims, 19 Drawing Sheets

(56) References Cited

U.S. PATENT DOCUMENTS

| | | |
|---|---|---|
| 2014/0250322 A1 | 9/2014 | Fleischmann et al. |
| 2016/0004449 A1 | 1/2016 | Lakshman et al. |
| 2016/0004450 A1 | 1/2016 | Lakshman et al. |
| 2016/0004451 A1 | 1/2016 | Lakshman et al. |
| 2016/0004466 A1 | 1/2016 | Lakshman |
| 2016/0004480 A1 | 1/2016 | Lakshman |
| 2016/0004481 A1 | 1/2016 | Lakshman |
| 2016/0004603 A1 | 1/2016 | Lakshman |
| 2016/0004611 A1 | 1/2016 | Lakshman et al. |
| 2016/0342532 A1* | 11/2016 | Peacock .............. G06F 21/6218 |
| 2017/0031614 A1 | 2/2017 | Katiyar et al. |
| 2017/0068472 A1 | 3/2017 | Periyagaram et al. |
| 2017/0177448 A1 | 6/2017 | Muth et al. |
| 2017/0295239 A1 | 10/2017 | Fang |
| 2017/0300254 A1 | 10/2017 | Mutha et al. |

\* cited by examiner

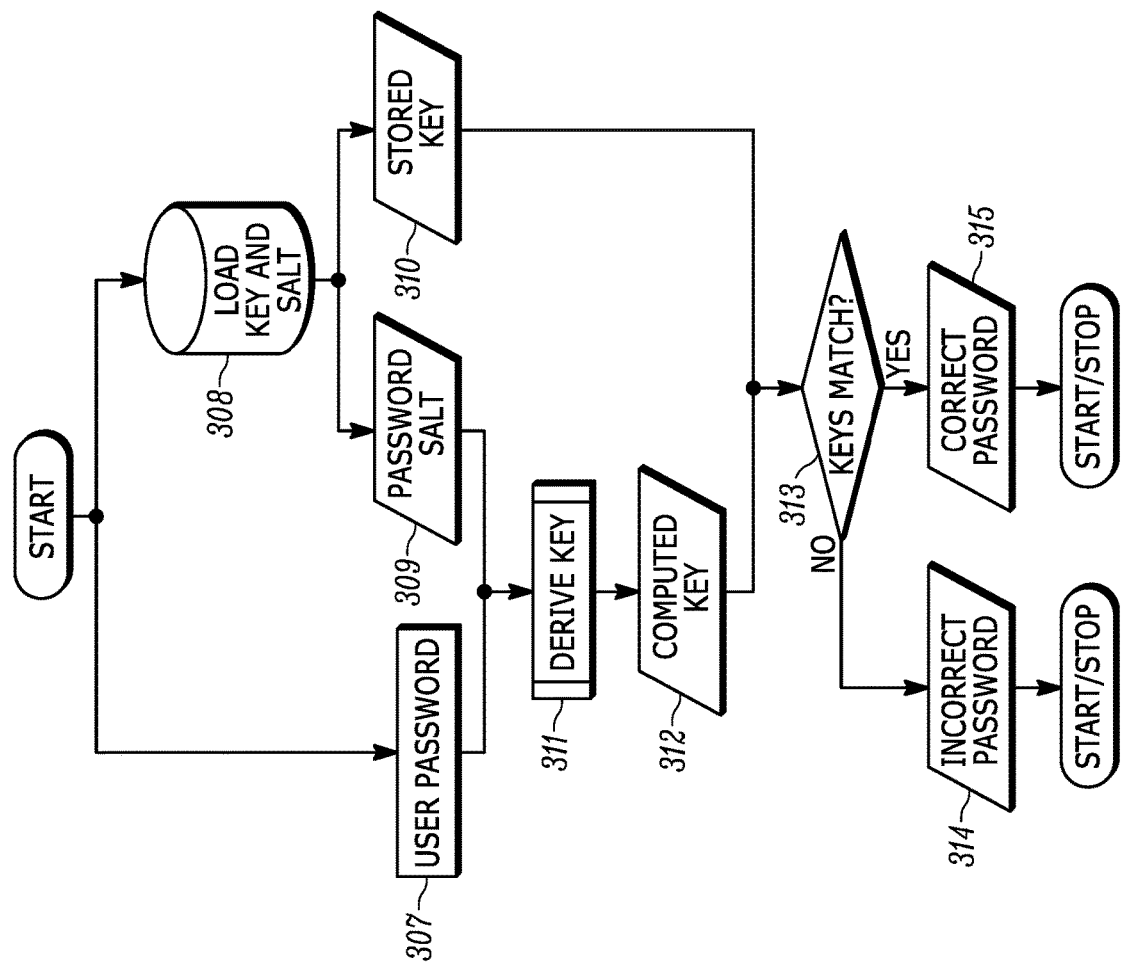
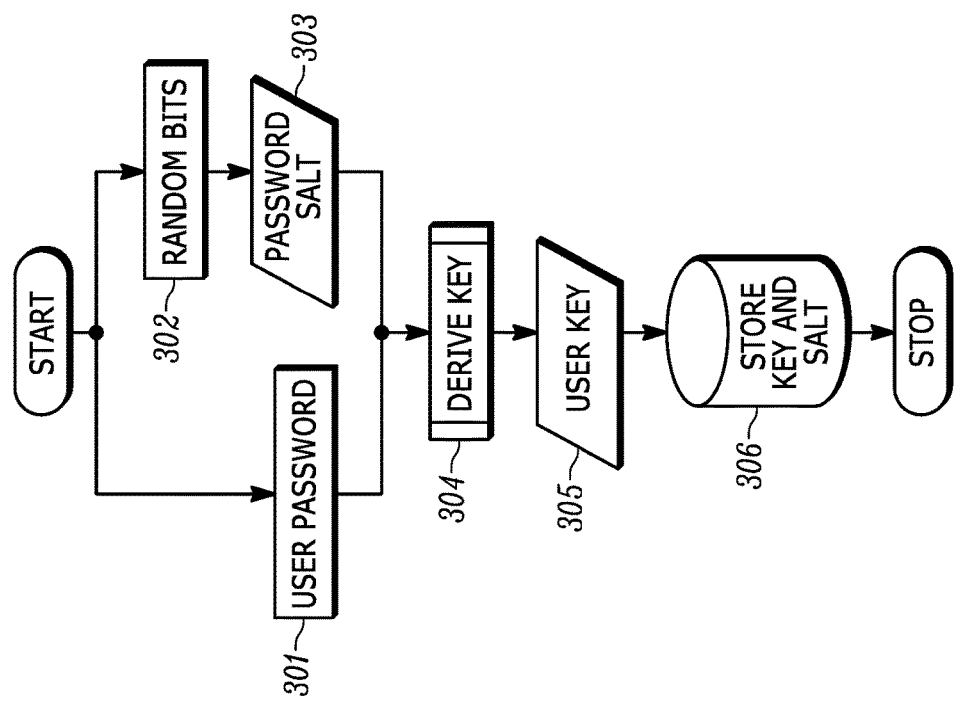
FIG. 3

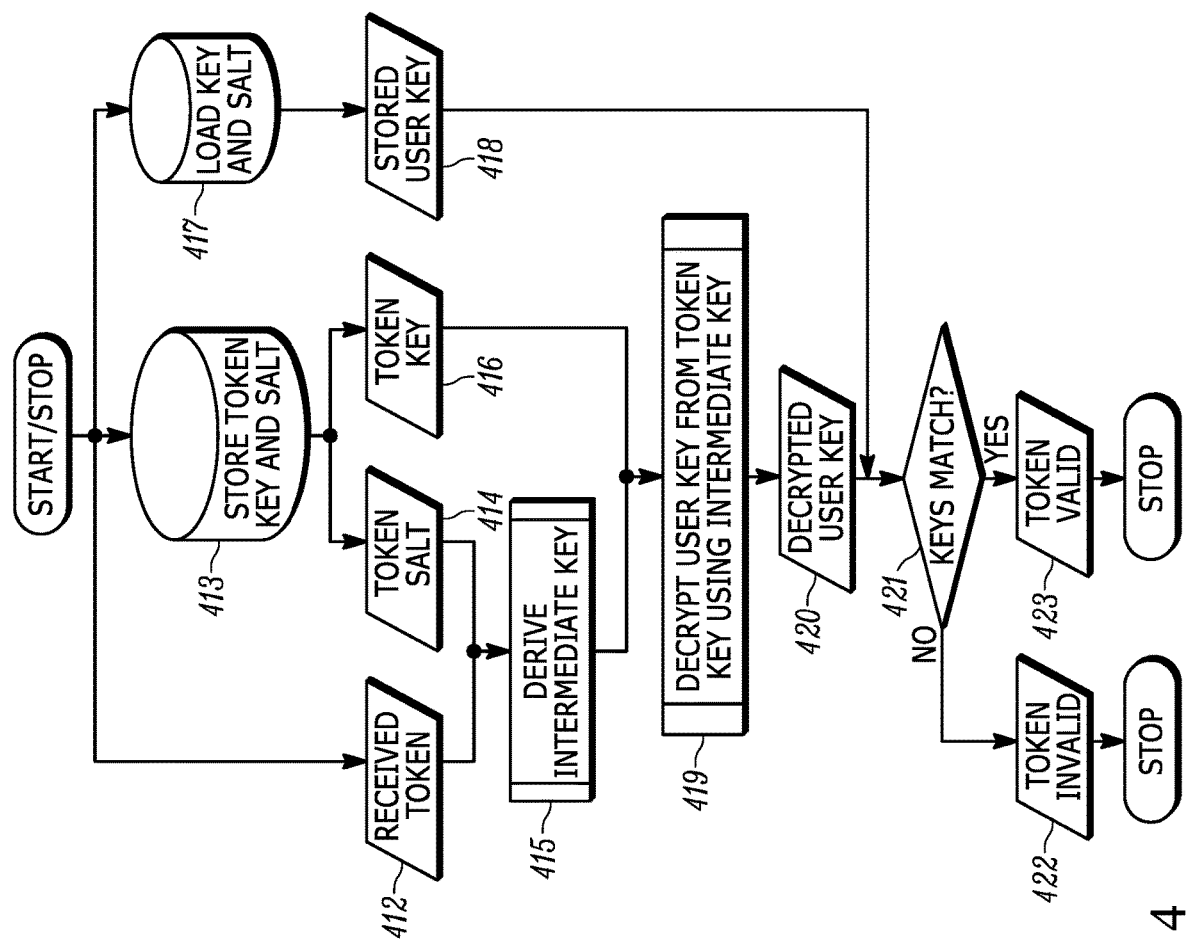
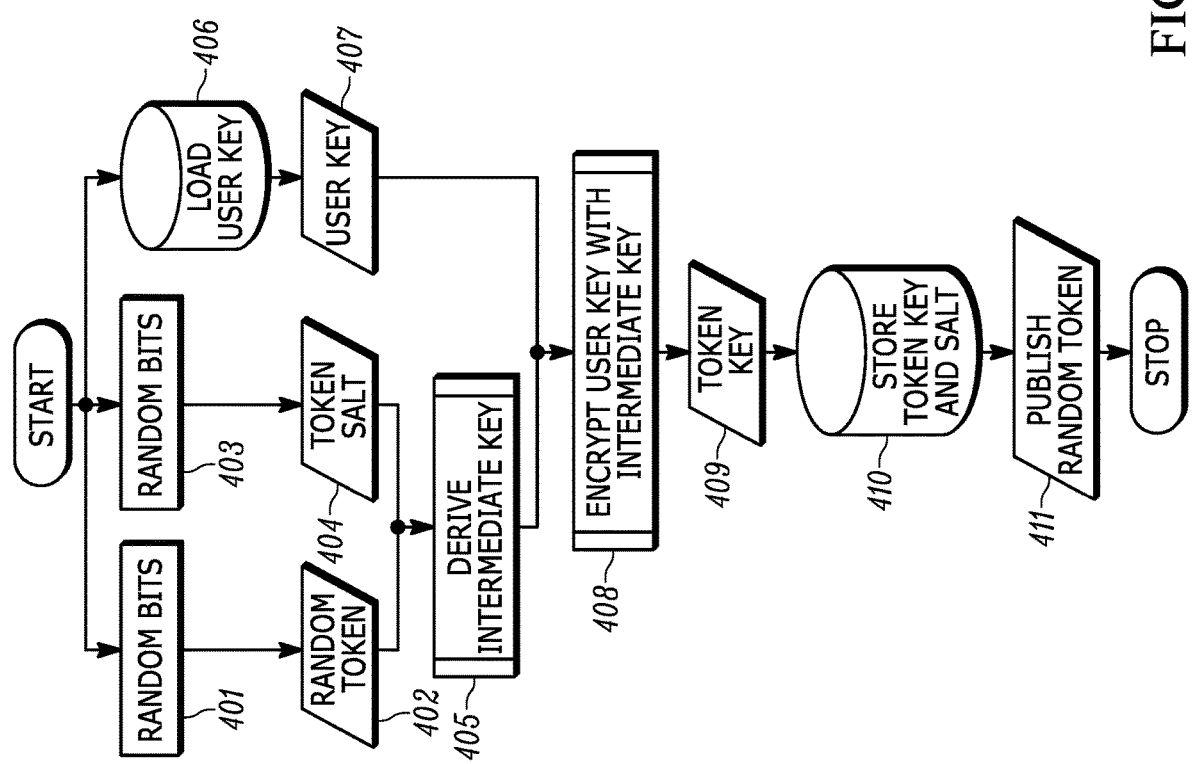
FIG. 4

| TERM | DEFINITION |
|---|---|
| BLOCK ID | A MEANS OF IDENTIFYING A PARTICULAR LOCATION IN A VOLUME. THIS WILL TYPICALLY INCLUDE THE LOCATION'S OFFSET FROM THE BEGINNING OF THE VOLUME BUT MAY ENCODE ADDITIONAL INFORMATION. |
| CLIENT | SYSTEM ON WHICH THE CLIENT APPLICATION IS RUNNING |
| CLIENT APPLICATION | A PROGRAM THAT CONSUMES DATA FROM THE STORAGE SYSTEM ON WHICH THE INVENTION RUNS |
| KEY MANAGEMENT PROTOCOL | THE MEANS OF USING CRYPTOGRAPHIC KEYS TO IMPLEMENT A WORKING SYSTEM |
| SECURE STORE | A SYSTEM FOR STORING CRYPTOGRAPHIC KEYS IN A SECURE FASHION |
| SERVER | SYSTEM ON WHICH THE DATA FOR A PARTICULAR VOLUME ARE STORED |
| STORAGE SYSTEM | THE STORAGE SYSTEM ON WHICH THE INVENTION RUNS |
| TRANSPORT ENCRYPTION | THE ENCRYPTION OF THE DATA STREAM BETWEEN TWO POINTS, TYPICALLY BETWEEN CLIENT AND SERVER |
| VOLUME | A SINGLE UNIT OF DATA STORAGE PRESENTED TO A CLIENT APPLICATION |

FIG. 14

| OPERATION | EXAMPLE IMPLEMENTATION | PURPOSE |
|---|---|---|
| DISK BLOCK CIPHER MODE | XTS-AES | CIPHER MODE SPECIALIZED FOR DATA STORED ON DISK |
| GENERIC KEY DERIVATION | HKDF | DERIVE KEYS FROM HIGH-ENTROPY INPUT MATERIAL |
| NETWORK TRANSPORT ENCRYPTION | TLS | PROTOCOL FOR SECURING NETWORK TRAFFIC |
| PASSWORD-BASED KEY DERIVATION | PBKDF#2 | DERIVE KEYS FROM A PASSWORD AND OTHER INPUT MATERIAL |
| SYMMETRIC ENCRYPTION AND DECRYPTION | AES-256-CBC | GENERAL-PURPOSE ENCRYPTION AND DECRYPTION |

SYSTEM AND METHOD FOR IMPLEMENTING CRYPTOGRAPHY IN A STORAGE SYSTEM

FIELD OF THE INVENTION

The invention relates to securing user data on a storage system using symmetric cryptography, and managing the keys so that authorized users can securely access the user data. The invention allows multiple encryption modes based on user requirements.

BACKGROUND

Storage products contain data users depend upon, yet often do not take steps to help users secure that data. This problem is especially serious when the hardware on which the storage product is running is managed by a third-party or placed in a location shared with untrusted parties. Additionally, even when the storage system is maintained in a secured environment, $3^{rd}$ party vendors may be required to access components of the system when replacing failed hardware components. As the failed components may often contain unsecured data, the disposal of the failed component becomes a costly commercial issue as the failed component may not provide a way to logically delete the data and therefore the component has to be physically destroyed.

The use of cryptographic methods allows the data to be scrambled using a key that is only known by authorized users. The key is used by the authorized user with a decryption method to descramble data that has previously been encrypted. Once the storage system utilizes cryptographic methods, all the data within any components of the storage system are scrambled and the data is not retrievable without the appropriate key.

Many encryption systems for storage systems over-simplify the problem space to the extent that they either provide inadequate protection, or no protection under many circumstances. Other systems require complex interactions, often involving the user in choices they are sometimes ill-equipped to make correctly. This lends itself to misuse, leading to security compromises, or simply to the data protection systems being disabled by the user. Complexity within cryptographic methods used in storage systems also means that verifying that the system is operating as desired is also complex which leads to operational issues.

SUMMARY OF THE INVENTION

A method for performing cryptography operations on data blocks within a volume of data is disclosed. The method involves generating a volume master key which is composed of random data and is stored in transient storage, generating a user key which is derived by processing a user password component known only to a user, and which is stored by the user in non-transient storage, generating a volume initialization vector which is stored at the storage system in non-transient storage and not known to the user, generating an intermediate key which is derived by combining a user supplied user key and the volume initialization vector which is supplied by the storage system, generating a user volume key, specific to a volume of data, which is generated by encrypting the volume master key with the intermediate key, and which is stored at the storage system in non-transient storage and is not known to the user, and performing cryptography operations on data blocks within an individual volume of data using the volume master key, the user key, the volume initialization vector, the intermediate key, and the user volume key.

In an embodiment, the method involves, at the storage system, receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, and performing cryptographic operations using the volume master key on data blocks received from the user and/or on data blocks sent to the user.

In an embodiment, the method involves generating multiple user volume keys linked to a single volume master key for the specific volume, wherein each user volume key is generated by encrypting the volume master key with the user intermediate key, and storing the generated user volume keys at the storage system in non-transient storage such that the user volume keys are not known to the users.

In an embodiment, the method involves removing the user volume key from the non-transient storage to prevent the computation of the volume master key for that individual user.

In an embodiment, the method involves removing the volume initialization vector for a specific volume from the non-transient storage to prevent the computation of the volume master key for all users.

In an embodiment, the method involves, at the storage system, receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, performing cryptographic operations using the volume master key on data blocks received from the user, and sending the data blocks on which the cryptographic operations were performed to a second storage system.

In an embodiment, the method involves, at the storage system, receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, performing cryptographic operations using the volume master key on data blocks received from a second storage system, and sending the data blocks on which the cryptographic operations were performed to the user.

In an embodiment, the steps of receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, and performing cryptographic operations using the volume master key on data blocks received from the user and/or on data blocks sent to the user are performed at a first storage system and the steps of receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, and performing cryptographic operations using the volume master key on data blocks received from the user and/or on data blocks sent to the user are also performed at a second storage system, where the first storage system is connected to the second storage system by a network connection.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 3 shows how a user key may be securely derived from a user password, and how that password can later be verified.

FIG. 4 shows how a secure token is generated from a key, and how a received token is securely verified.

FIG. 14 is a table of term definitions.

FIG. 15 is a table that defines cryptography-based operations, and gives a non-normative example implementation of each operation.

FIG. 16 is a formulaic representation of an encryption operation.

FIG. 17 is a formulaic representation of a decryption operation.

FIG. 18 is a formulaic representation of a decryption after encryption operation.

Throughout the description, similar reference numbers may be used to identify similar elements. Additionally, in some cases, reference numbers are not repeated in each figure in order to preserve the clarity and avoid cluttering of the figures.

DETAILED DESCRIPTION

Figure 1:
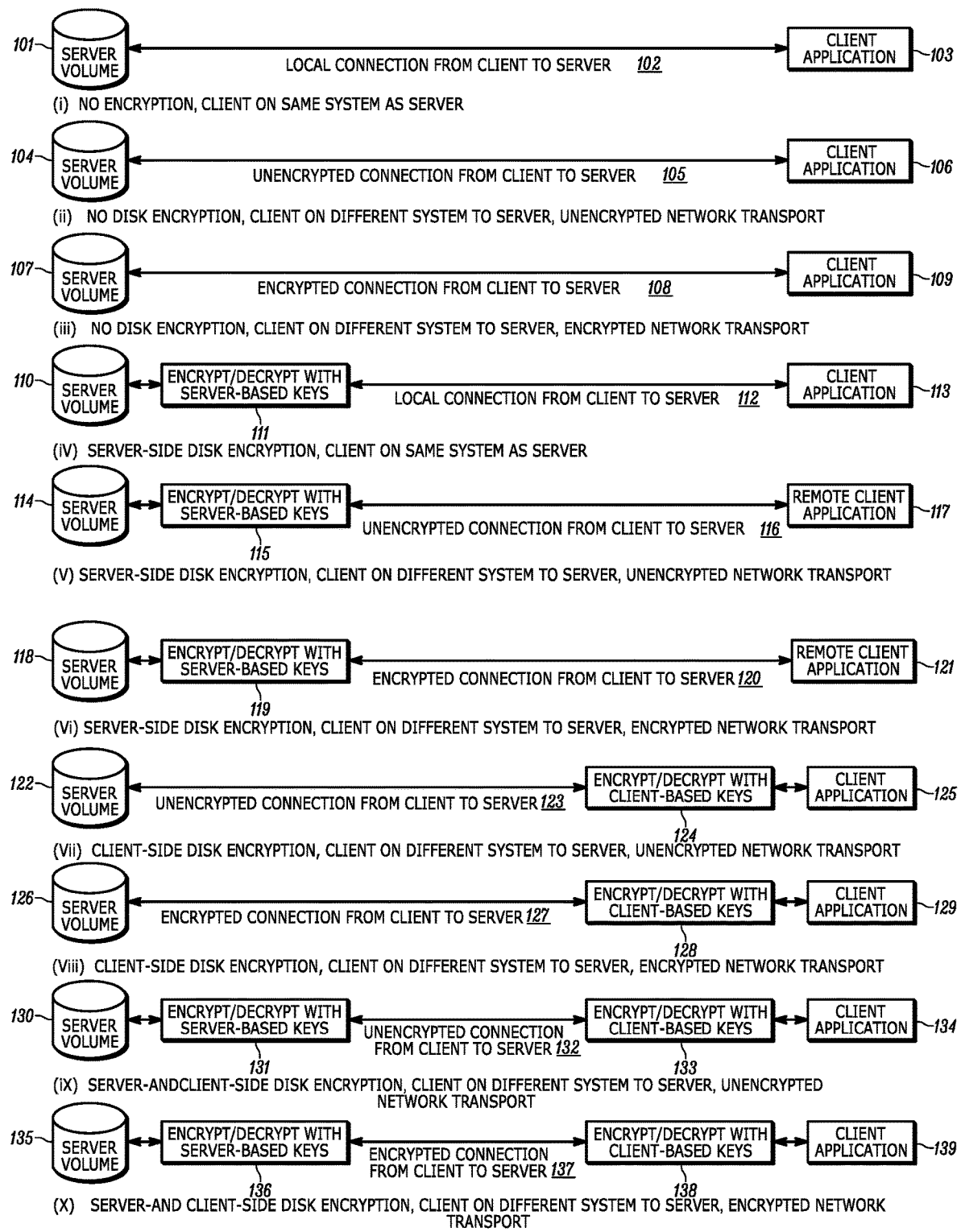
FIG. 1 illustrates the operating modes supported by the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

The present application provides a high-performance symmetric encryption and key management system for storage arrays.

In one embodiment, symmetric cryptography methods are used for performance and simplicity, such that it may be used as the default mode of operation within a storage system. As a result, data which is stored by the storage system is always stored in an encrypted format and is protected by cartographic methods.

In another embodiment, a method is disclosed to allow for the storage of recovery information in a system separate to the storage system so that data that has been encoded using a cryptographic method can be decoded in its entirety even if the original keys that were utilized to encode the data originally have been irrecoverably lost. The recovery information can be stored offline to provide a further security advantage.

The disclosed techniques may support a multiplicity of operating modes to cover many deployment scenarios, using a unified key management scheme with minimal key storage overhead. These operating modes provide security for both local and network-based access to the volume.

The disclosed techniques are applicable to both server-based and client-based encryption, so deployments are possible where the server does not ever possess the keys to access the unencrypted data. This is especially valuable for scenarios where data must be stored on untrusted hardware, but must be kept secret from privileged users of the untrusted hardware. Server- and client-based encryption may be used concurrently or independently, depending on user requirements.

The disclosed techniques may support multiple independent users of an encrypted volume without additional storage requirements. Users may change their keys and retain access to encrypted volumes without computationally expensive rekeying operations on the volumes themselves.

The disclosed techniques may involve encrypting each volume with its own random keying information, independent of other volumes. Users' access to encrypted volumes is controlled on a per-volume basis and a user's access to any particular volume may be granted or revoked at any time.

A method for cryptographically protecting user data volumes in a distributed storage platform is disclosed. In an embodiment, data volumes are accessible only to authorized users. Cryptographic key management supports a variety of configurations of the storage platform, from a local-only deployment where data only needs to be protected 'at rest', to an end-to-end encrypted system where the system providing the disk storage does not ever possess the keys to decrypt user data. The symmetric encryption keys protecting the data on disk are never stored directly, and can only be derived using an authorized user's unique key. Keys can be changed at any time without lengthy recalculation. In another embodiment, an out-of-band data recovery mechanism is also provided to satisfy regulatory or legal requirements.

Various terms used in the description are defined in the table of FIG. 14. FIG. 15 lists cryptographic operations, along with a suitable example implementation of the operation. It is noted that the disclosed technique is not limited to use with the example implementations.

Modes of Operation

FIG. 1 shows the operation modes the invention supports.

FIGS. 1(*i*) and 1(*ii*) are cases where no encryption is present. They are present in the diagrams purely to provide a complete progression from unencrypted to encrypted operation.

FIG. 1(*iii*) encrypts data in transit from the Client to the Server. No encryption of data blocks is performed on the Client or Server; only Transport Encryption is present. We note that this provides no protection for data at rest on the server.

FIG. 1(*iv*) protects data-at-rest on the Server. The Client runs on the same system as the Server, so no Transport Encryption is less likely to be necessary or desirable. The Client does not perform its own encryption of the data.

FIG. 1(*v*) protects data-at-rest on the Server, but does not encrypt data on the network. The Client does not perform its own encryption of the data. This mode is suitable where the network is owned and/or trusted, or when only data-at-rest encryption is required.

FIG. 1(*vi*) protects data-at-rest on the Server, and protects the data on the network with Transport Encryption. The Client does not perform its own encryption of the data.

FIG. 1(*vii*) does not explicitly protect data-at-rest on the server. The Client performs its own encryption of the data. This means that the data-at-rest are protected insofar as a key that is valid for decryption of the data is required, however this is not necessarily under the Server's control; the Client may choose to use insecure keys, or no keys at all. Data are not protected in transit. This is a less serious information leak than, for example, FIG. 1(*v*) as the unencrypted data are not visible. However, additional information such as data block offsets and request lengths are transmitted without protection, and this information may be of use to someone attempting to attack the cryptography of the Client.

FIG. 1(*viii*) is similar to FIG. 1(*vii*) but adds Transport Encryption to protect data-in-transit. This mode is recommended over FIG. 1(*vii*) as it minimizes information leakage that may help an attacker.

FIG. 1(*ix*) protects data-at-rest on the Server and, using potentially separate keys, data on the Client. The Client may be configured using keys valid on the Server, but more likely will use separate keys not known to the Server. This mode allows the Server to precisely control access to a volume (by requiring a key), but does not require that the Server be able to fully decrypt the data. No Transport Encryption is present; however we note that the data in transit are still in encrypted form. As discussed for FIG. 1(*vii*), this is a less serious information leak than, for example, FIG. 1(*v*) as the unencrypted data are not visible. However, additional information such as data block offsets and request lengths are transmitted without protection, and this information may be of use to someone attempting to attack the cryptography of the Client.

FIG. 1(*x*) is the same as FIG. 1(*ix*) but adds Transport Encryption to protect data-in-transit. This mode is recommended over FIG. 1(*ix*) as it minimizes information leakage that may help an attacker.

Mode (i) and (ii) [101-106] of FIG. 1 performs no encryption of disk data or network transport, and are illustrated for comparison purposes only. Mode (i) shows the Server [101] and the Client [103] connected directly [201], that is, with no intervening computer network. Mode (ii) shows the Server [104] and Client [106] connected via a computer network [105].

Mode (iii) of FIG. 1 has the Server [107] connected to the Client [109] via a network. This mode performs no disk encryption, but adds Transport Encryption between the Server and the Client. This mode is illustrated to show the independence of Transport Encryption and the disclosed technique's disk encryption.

Mode (iv) of FIG. 1 utilizes the disclosed technique's data encryption [111] on the Server [110]. The Client [113] is directly connected [112] without a network. Data are delivered to the Client in unencrypted form, but are encrypted on the Server's disks.

Mode (v) of FIG. 1 utilizes the disclosed technique's data encryption [115] on the Server [114]. The Client [117] is connected via a network [116] without Transport Encryption. Data are delivered to the Client in unencrypted form, and are send unencrypted over the network. The data are encrypted on the Server's disks.

Mode (vi) of FIG. 1 utilizes the disclosed technique's data encryption [119] on the Server [118]. The Client [121] is connected via a network and uses Transport Encryption [120]. Data are delivered to the Client in unencrypted form, but are sent encrypted over the network. The data are encrypted on the Server's disks.

Mode (vii) of FIG. 1 utilizes the disclosed technique's data encryption [124] on the Client [125]. The Client is connected to the Server [122] via a network [123] without Transport Encryption. Data are stored on the Server's disks in an encrypted form and are never transmitted over the network in unencrypted form. However, information about the data being sent across the network such as Block IDs and read and write request sizes are sent unencrypted over the network. This information may be useful to an attacker.

Mode (vii) of FIG. 1 utilizes the disclosed technique's data encryption [128] on the Client [129]. The Client is connected to the Server [126] via a network and uses Transport Encryption [127]. Data are stored on the Server's disks in an encrypted form and are never transmitted over the network in unencrypted form. Further, information about the data being sent across the network such as Block IDs and read and write request sizes are encrypted, limiting the amount of information available to an attacker.

Mode (ix) of FIG. 1 utilizes the disclosed technique's data encryption [131] and [133] on both the Client [134] and the Server [130]. The Client is connected to the Server via a network [132] without Transport Encryption. Data are stored on the Server's disks after being encrypted twice, and the Server does not necessarily have the keys necessary to read the data in their unencrypted form. Unencrypted data are never sent across the network. However, information about the data being sent across the network such as Block IDs and read and write request sizes are sent unencrypted over the network. This information may be useful to an attacker.

Mode (x) of FIG. 1 utilizes the disclosed technique's data encryption [136] and [138] on both the Client [139] and the Server [135]. The Client is connected to the Server via a network and uses Transport Encryption [137]. Data are stored on the Server's disks after being encrypted twice, and the Server does not necessarily have the keys necessary to read the data in their unencrypted form. Unencrypted data are never sent across the network. Further, information about the data being sent across the network such as Block IDs and read and write request sizes are encrypted, limiting the amount of information available to an attacker.

Key Management Protocol

Use of Cryptography

To facilitate clarity in explanation, the following important properties of any Symmetric Cipher are noted. In mathematical terms, the Cipher defines two operations, encryption (denoted by E) and decryption (denoted by D). For a key k, an unencrypted value P, the encrypted value C is shown in FIG. 16. FIG. 16 shows that the encrypted value (the Ciphertext) is the result of encrypting the unencrypted value (the Plaintext) with the key k. The reverse is also true for the Symmetric Cipher, as shown in FIG. 17. FIG. 17 illustrates that the original, unencrypted value is the result of decrypting the encrypted value with the same key k. Substitution of the value of C from FIG. 16 into FIG. 17 gives the result in FIG. 18. FIG. 18 shows that encrypting the plaintext with a key, then decrypting it with the same key, gives the plaintext.

The results of FIGS. 16, 17 and 18 are used extensively. In many parts of the disclosed technique an Intermediate Key is generated, using a combination of two or more inputs to some Key Derivation Function. The Intermediate Key's inputs are carefully designed to be a combination of something about the user (the User Key) and something about the value being protected, e.g., the Token Salt (see FIG. 4), or the Volume IV (see FIG. 5).

An Intermediate Key is used as the key to encrypt a value as in FIG. 16, and store the encrypted result. Then, at a later date we recreate the key we derived using the same inputs, and decrypt that stored, encrypted result (FIG. 17). FIG. 18 concisely expresses the notion that as long as we can find the key k, we can always decrypt the original values of anything we encrypted using that key.

Figure 8:
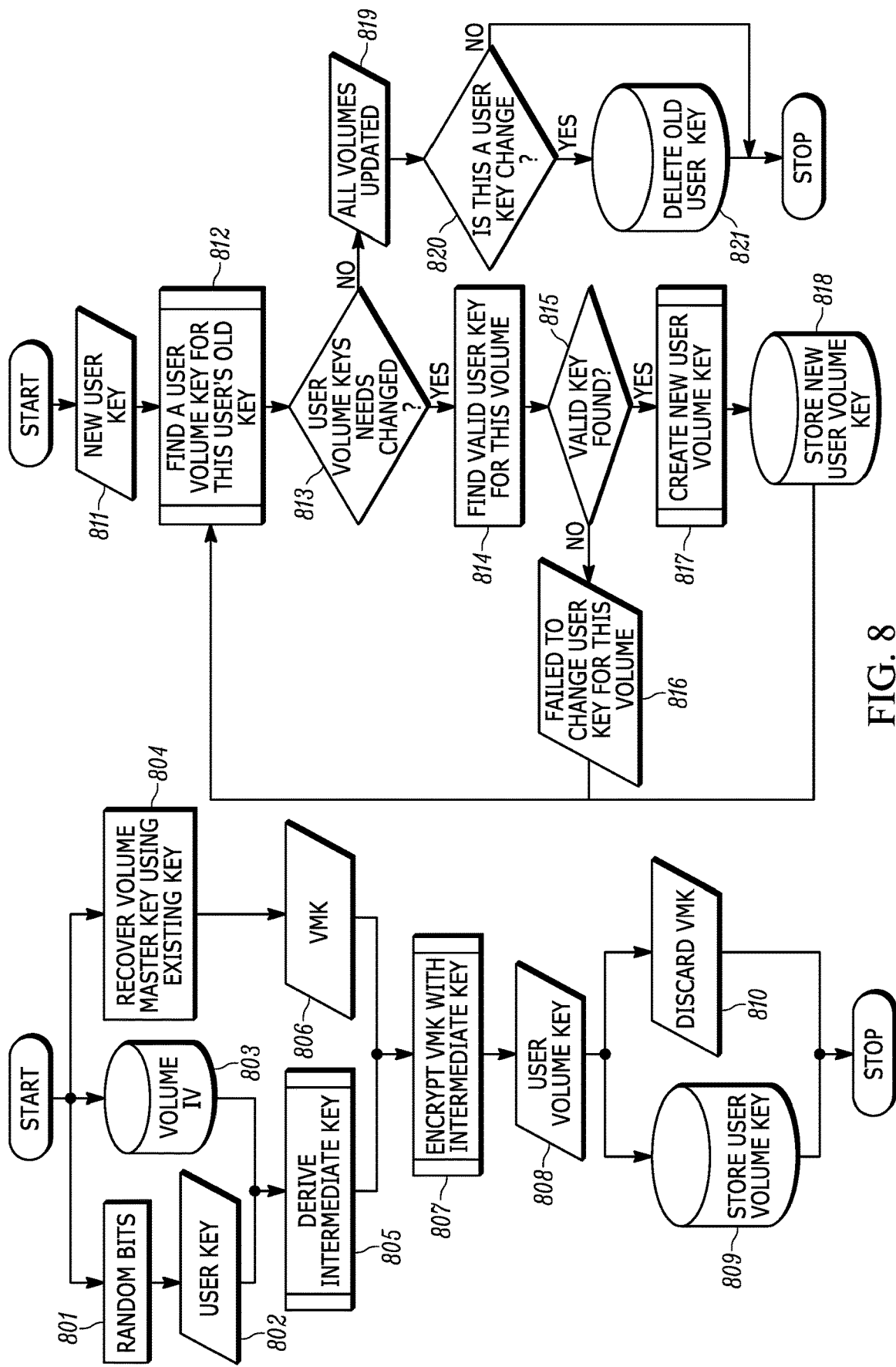
FIG. 8 shows how additional volume access keys are generated, and how access to volumes is maintained when a key is changed.

This is used for Tokens (see FIG. 4), User Volume Key generation (see FIG. 5), Volume Master Key recovery (see FIG. 6), and to change a User Key (see FIG. 8).

Keys, Passwords and Tokens

For simplicity of description, all keys in the disclosed technique are of the same format: A set number of bits of random data. There are a number of types of keys, used for different purposes, but they all have the multiples of the same size, and the same format.

Passwords are user-provided sequences of characters and symbols. User-provided passwords are not sufficiently random for use for cryptography, and we will use additional random data to derive stronger keys from passwords.

Tokens are data that are generated to allow users to identify themselves to the system without disclosing their password. Tokens are typically presented as long text strings that the user can present when requested.

User Key

Figure 2:
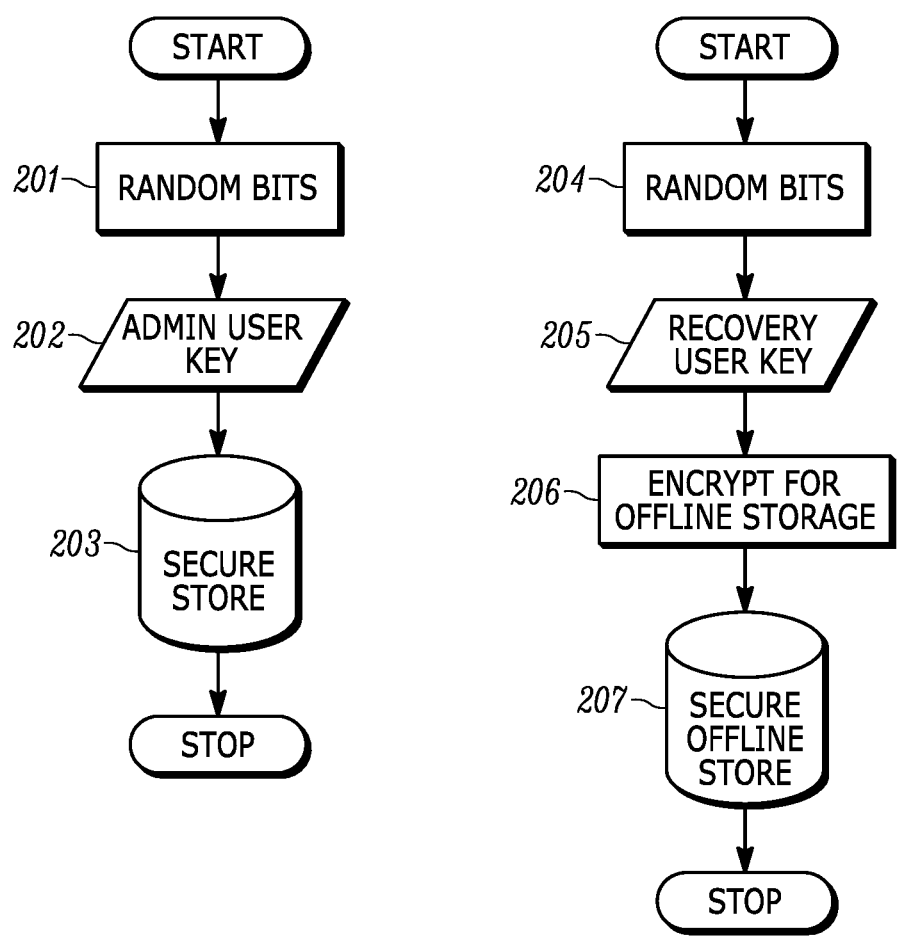
FIG. 2 illustrates key generation for a user, and the extra steps for a recovery user.

FIG. 2 shows the generation of User Keys [202, 205] using random data [201, 204] from a cryptographically-strong pseudo random number generator. The key size is governed by the choice Symmetric Encryption and Decryption Cipher; in the case of AES-256-CBC, the User Key Size is 256 bits.

A User Key [202] is placed in the Secure Store [203]. We utilize User Keys to encrypt other information. Users are not typically given their keys; instead, they either have the password that was used to generate the User Key, or a token that was generated from the User Key.

A special case of a User Key, intended for recovery purposes in the case of system failures, is a Recovery User Key [205]. Since this key can be used to recover data, it should be encrypted [206] and securely stored outside the Storage System, using a suitable external tool such as an encrypted file on a USB storage device, or a printed copy inside a physical safe.

User Password Key Generation and Verification

Passwords are strings of text input directly by a User. As shown in FIG. 3, the password [301] is combined with random data [302] ('Password Salt'. [303]) and passed through a Password-Based Key Derivation Function [304] to obtain a User Key [305]. The User Key and Password Salt are placed in the Secure Store [306] for later use.

Later, the user inputs a validating password [307] that can be used to verify the user's identity. The Password Salt [303] is reloaded [308] along with the User Key (as stored in [306]). We derive [311] a Computed Key [312] using the same mechanism as the User Key [305], by passing the validating password and Password Salt through the same Password-Based Key Derivation Function as [304]. If the Computed Key [304] and the Stored Key [310] match [313], then the user input the correct password [314]. If the Computed Key and the Stored Key do not match [315], then the user did not enter the correct password.

Without the correct User Key, the user will not be able to decrypt any data.

Token Generation and Verification

A Token is an alternative means of identifying a user to the system. Instead of providing a single password, the user can be given an arbitrary number of Tokens to identify themselves. These are generated and verified using, for example, the processes shown in FIG. 4, with reference to the cryptographic results in FIGS. 16, 17 and 18.

A user with an existing User Key wishes to use a token. We load the key from the Secure Store [406, 407], and generate a Random Token [401, 402] and a Token Salt [403, 404]. The Random Token and Token Salt are passed through the Generic Key Derivation Function [405], resulting in an intermediate key. We then encrypt the User Key [407] with the Symmetric Cipher, using the intermediate key as the key [408]. The result is the Token Key [409].

The Token Key and the Token Salt are then stored [410], and publish to the user [411] the Random Token [402].

When the user presents the Received Token [412], we must verify that the token was issued to the user. We load from the Secure Store the Token Key and Token Salt [413, 414, 416]. As in [405], we use the Received Token and the Token Salt to generate an intermediate key [415]. If the Received Token is the same as the Random Token [402], the intermediate key will match the one generated earlier [405]. As a result, using FIGS. 16, 17 and 18, the result of decrypting the Token Key using the intermediate key [419] will match [421] the Stored User Key. If the keys match, the token is valid [423]; otherwise, the token is invalid [422].

Volume Master Key

The Volume Master Key is used to encrypt data on the Volume. Each Volume has its own Volume Master Key. Normally the Block Cipher Mode will require information in addition to the key in order to securely encrypt a large amount of data. In the case of the example block cipher given here, the additional information is related to the location of the data within the Volume.

In an embodiment, a Volume Master Key is not stored in persistent storage of any kind. It can always be derived using a combination of a User Key and other information, and recovered as shown in FIGS. 16, 17, and 18. As a result, and by design, deleting all User Keys configured for a volume makes the Volume inaccessible.

Volume Initialization Value (IV)

Figure 5:
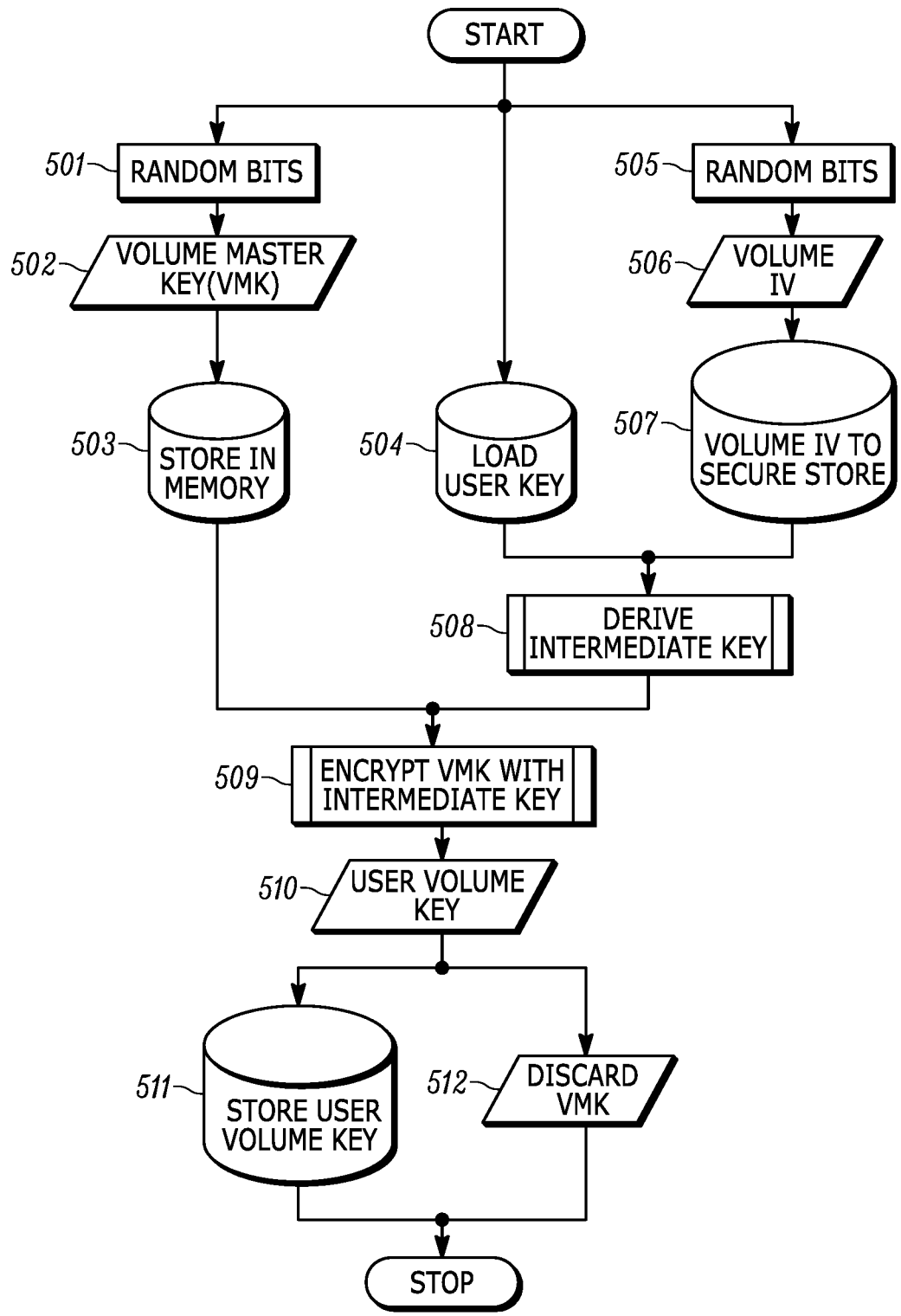
FIG. 5 illustrates how a new encrypted volume is created.

The Volume Initialization Value (IV) is a per-volume block of random data used for key operations, generated as shown in FIG. 5 [505, 506, 507]. The Volume IV is not directly used in the Disk Block Cipher Mode, but is instead used when generating Intermediate Keys in order to recover the Volume Master Key in line with FIGS. 16, 17 and 18, and for other operations of the Key Management Protocol.

User Volume Key

Every Volume has a list of zero or more User Volume Keys, located in the Secure Store.

Figure 7:
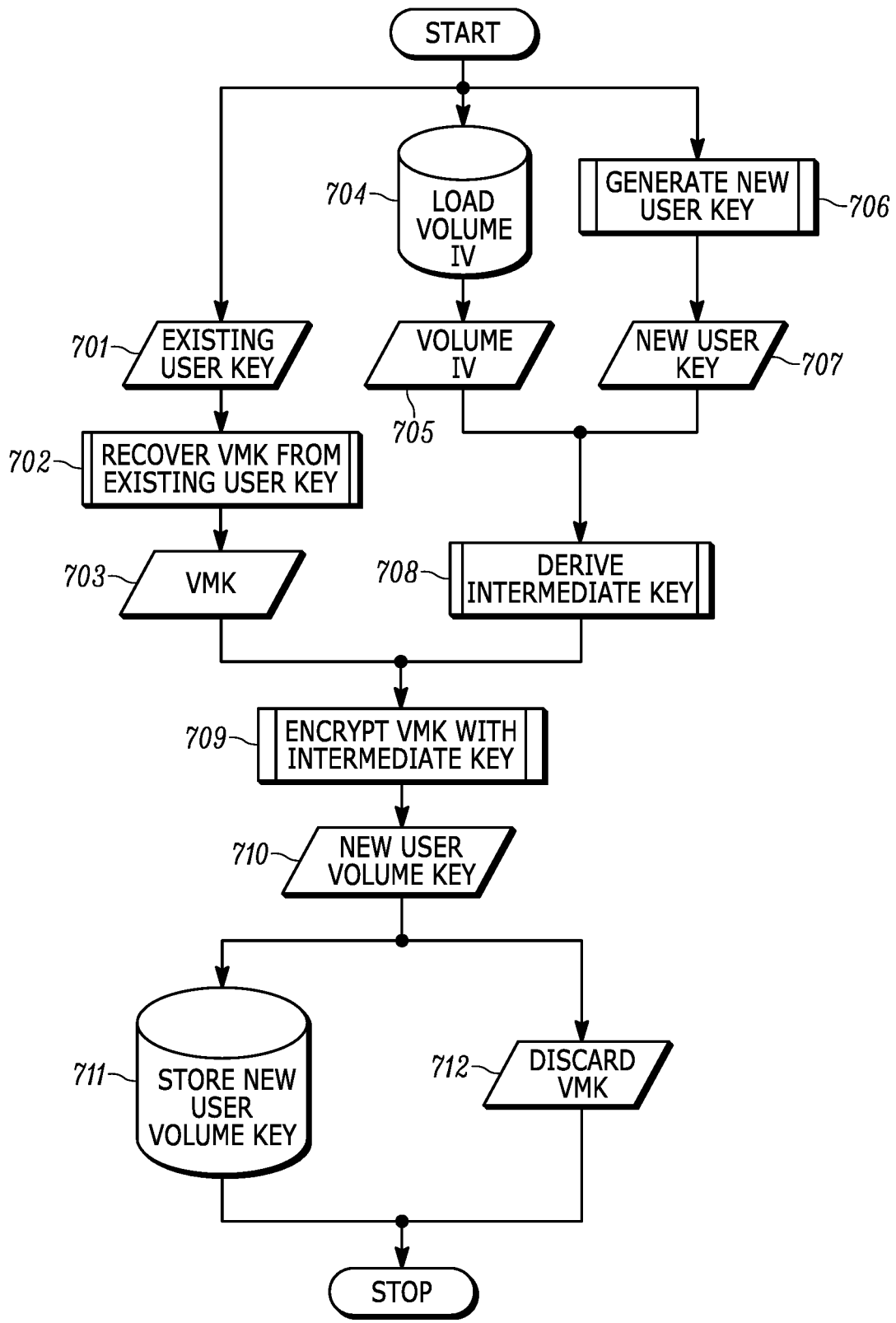
FIG. 7 illustrates the means by which a new user is given access to an existing volume.

The User Volume Key is a combination of the User Key and the Volume IV, generated as shown in FIG. 5, FIG. 7, and FIG. 8. A valid User Volume Key is the only means of recovering the Volume Master Key for a volume. As a result, a volume with no User Volume Keys is inaccessible to any user.

There can be more than one User Volume Key for a user, and this is likely to be the case momentarily when changing the User Key, as shown in FIG. 8.

Intermediate Key

At many points in the Protocol an Intermediate Key will be needed. This is a key derived (using a cryptographic key derivation function) from one or more pieces of known information, for example a User Key and a Volume IV.

Volume Creation

With at least one User Key, we can create a Volume; the other inputs we require are random data. The process is shown in FIG. 5. A Volume Master Key is generated [502] using random bits [501], and stored in system memory [503] but not in any persistent store. A Volume IV is also generated [505, 506] and this is placed in Secure Storage [507]. Finally, a User Key is recovered from the Secure Store [504].

An intermediate key is derived [508], and the Volume Master Key is encrypted using the intermediate key [509], in line with FIGS. 16, 17 and 18. The result, referred to as the User Volume Key [510], is placed in the Secure Store. The Volume Master Key is no longer needed, and may be destroyed.

If a Recovery Key [205, 206, 207] is available, a User Volume Key must be generated using this process, and the resulting User Volume Key stored securely offline along with the Recovery Key.

Recovering the Volume Master Key

Figure 6:
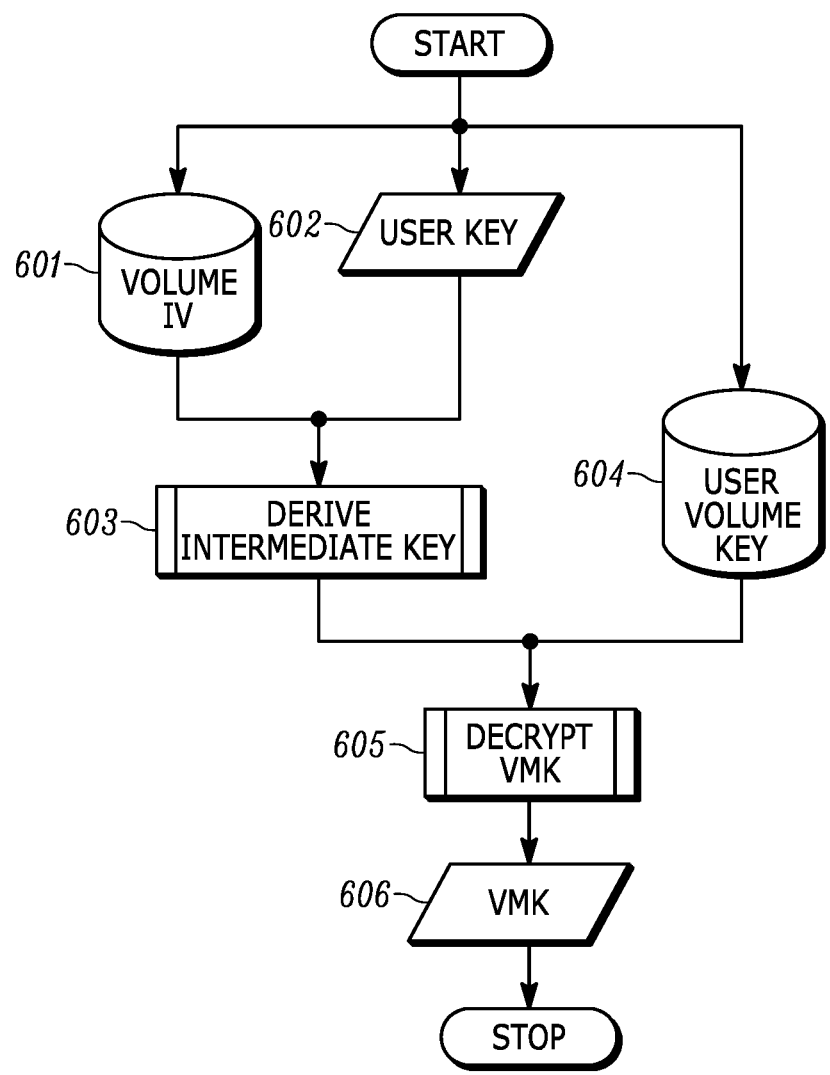
FIG. 6 shows how to recover a volume master key given a valid user key.

Since we will store both the User Key and the Volume IV in the Secure Store, we have the means to recreate the Intermediate Key at any time. As a result, we have the means to recreate the Volume Master Key at any time as shown in FIG. 6.

Figure 10:
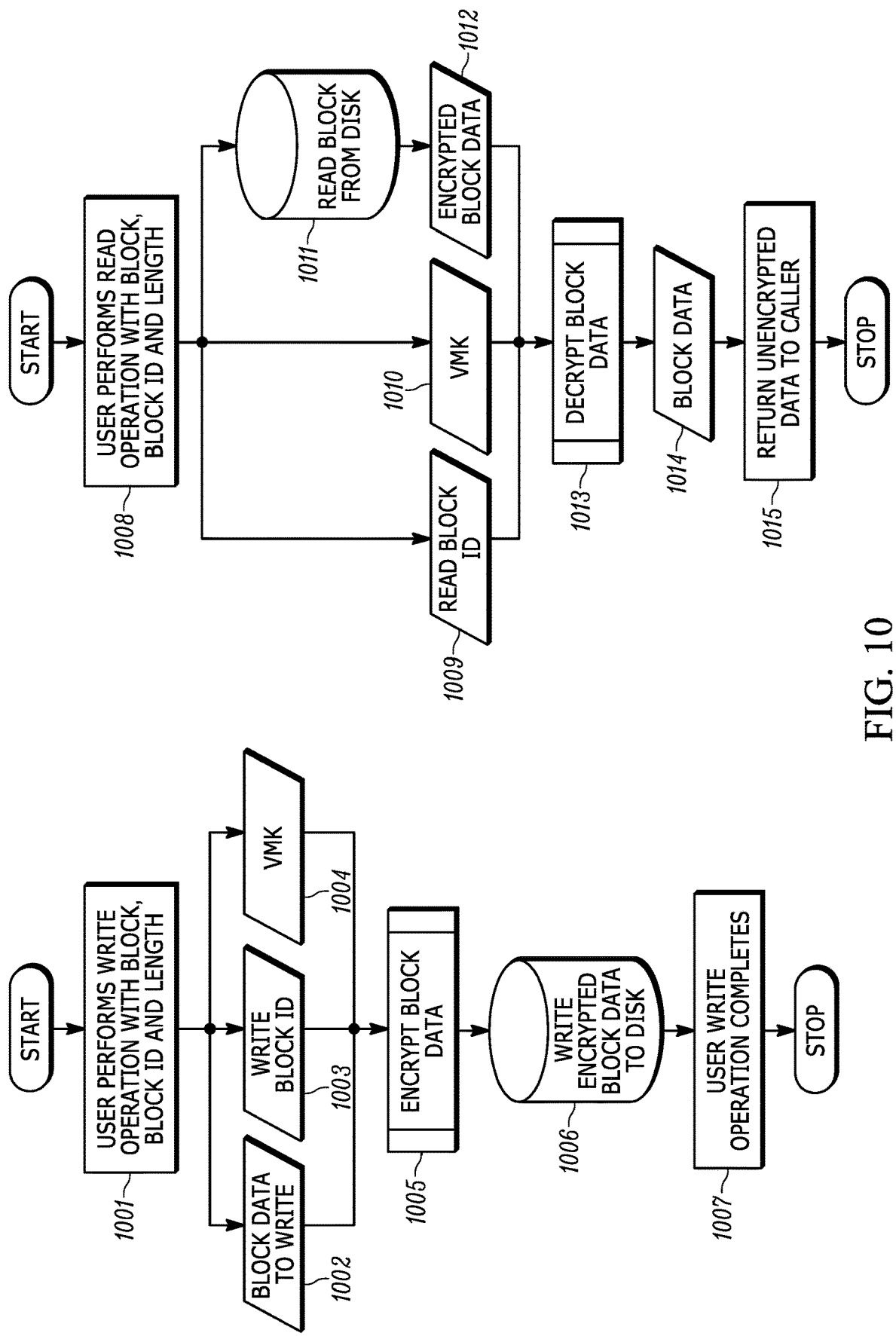
FIG. 10 illustrates how keys are used when writing encrypted data to, and reading encrypted data from, a volume.

The Volume IV [601], a User Key [602], and the corresponding User Volume Key [604] are recovered from the Secure Store. An intermediate key is derived [603] from the Volume IV and User Key exactly as in [508], then in line with FIGS. 16, 17 and 18 we can decrypt the Volume Master Key [605, 606]. With the Volume Master Key, we can decrypt disk blocks as shown in FIG. 10.

Enabling Additional Users to Decrypt the Volume

Given a User Key, and for a given volume a valid User Volume Key and Volume IV, we can recover the Volume Master Key and use it to generate a User Volume Key for another user, as shown in FIG. 7.

To add a user, the Volume Master Key is required. Assuming the Volume Master Key is not cached in memory, it must be recovered from an existing User Key [701, 702, 703] using the process in FIG. 6. The Volume IV must be recovered [704, 705], and a new User Key generated if required [706, 707]. With the Volume IV and the new User Key, an intermediate key can be derived [708], and the Volume Master Key encrypted with the intermediate key [709]. The result is the new User Volume Key for the new user [710], which can be used as in FIGS. 16, 17 and 18 to decrypt the Volume Master Key in the future. The new User Volume Key must be stored [711], and the Volume Master Key can now be discarded [712].

Applying a Changed User Key to Volumes

FIG. 8 shows how the change of a User Key, e.g., when a password changes, is applied to Volumes. In this case, all the user's User Volume Keys need to be regenerated. The process is shown first for an individual Volume, and then that process is applied to all volumes.

We recover the Volume Master Key [804] using a valid User Key, following the process in FIG. 6.

A new user key [802] is generated from random bits [801] if required. The Volume IV, which does not change, is loaded [803]. A new intermediate key is derived [805], and the Volume Master Key [806] is encrypted with the intermediate key [807]. The result is the new user volume Key [808], and will be used to decrypt the Volume Master Key later using the results from FIGS. 16, 17 and 18. The new User Volume Key is placed in the Secure Store [809] and the Volume Master Key is no longer needed [810].

The steps [801-810] must be applied for each Volume for which the user has a User Volume Key. There is no alternative; the User Key and the Volume IV are required in order to generate an intermediate key, and thence decrypt the Volume Master Key from the User Volume Key. If the User Key is changed, the new User Key will not generate the same intermediate key, and so will no longer decrypt the old User Volume Key. We must generate a new User Volume Key.

To apply to all volumes, the new User Key is loaded [811]. We find a Volume for which there is a matching User Volume Key [812, 813], and if the User Volume Key needs to be changed, follow the procedure to change it [801-810], and create [817] and store [818] the new volume key, before resuming the search for relevant volumes at [812]. The failure check in [814, 815] checks that we have a valid key to match an existing User Volume Key. If not [816], this volume is currently inaccessible for this user and will remain so—resume the search for relevant volumes at [812], optionally reporting the error to the user.

Revoking a User Key's Access to all Volumes

Figure 9:
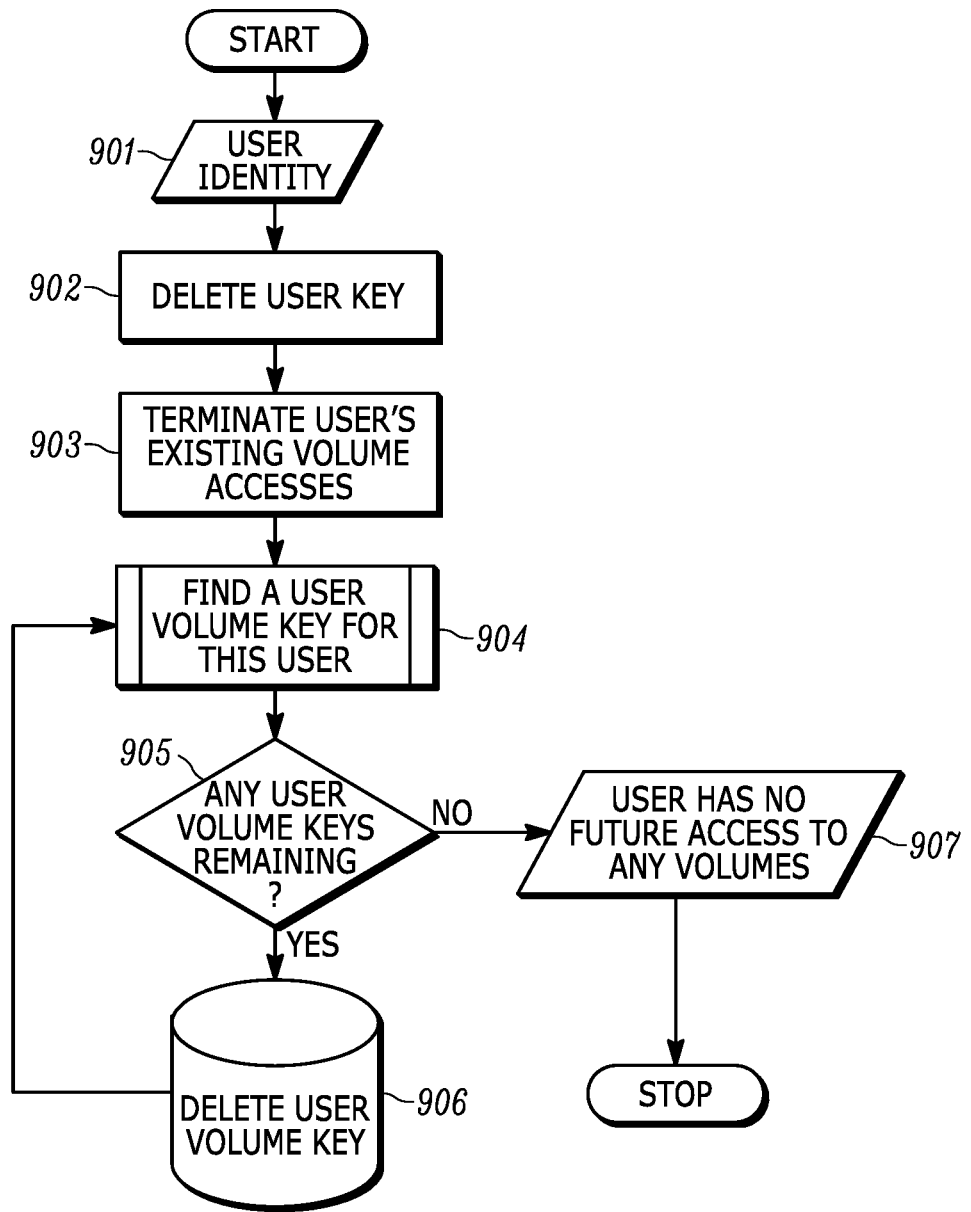
FIG. 9 shows how a user's access is revoked.

FIG. 9 shows how to revoke all access for a User Key [901] to all volumes. Note that the first action [902]—deleting the User Key—effectively removes all future access, as the User Key is required to generate the Intermediate Key, which in turn is required to decrypt the Volume Master Key as shown in FIG. 6.

Terminating existing accesses [903] discontinues that user's existing sessions. Subsequent access attempts will fail, because the User Key was deleted, and so the intermediate key cannot be derived. Volumes are searched [904, 905] for any Volume User Keys associated with the User Key, and those keys are deleted [906]. When all Volumes have been so processed, the user's access is fully revoked [907].

Disk Access

In an embodiment, all encryption and decryption follows the model shown in FIG. 10. Different deployment modes use the encryption and decryption in different combinations.

Writing and Reading Encrypted Data to Disk, Mode (iv)

FIG. 10 illustrates implementation of the operating mode shown in FIG. 1(*iv*). The Volume Master Key will have been recovered previously using the process shown in FIG. 6 and for performance will most likely be cached in system memory. Other inputs are provided at the time of invocation.

The standard block write and block read operations are shown in FIG. 10.

The user performs a write operation [1001]. For writing, the Disk Block Cipher Mode requires the Volume Master Key [1004], a Block ID [1003], the data block to write and the block's length [1002]. With these inputs, the cipher mode returns a block of encrypted data [1005], which is written to the Volume at the location identified by the Block ID [1006]. The write operation is completed, and status returned to the user [1007].

For reading [1008], the Disk Block Cipher Mode requires the Volume Master Key[1010], a Block ID [1009], the length of the read operation, and an encrypted block read from the Volume [1011, 1012]. With these inputs, the Block Cipher Mode [1013] returns the decrypted block [1014], which is then returned to the User [1015].

Networked Data Write and Read, Modes (v) and (vi)

Figure 11A:
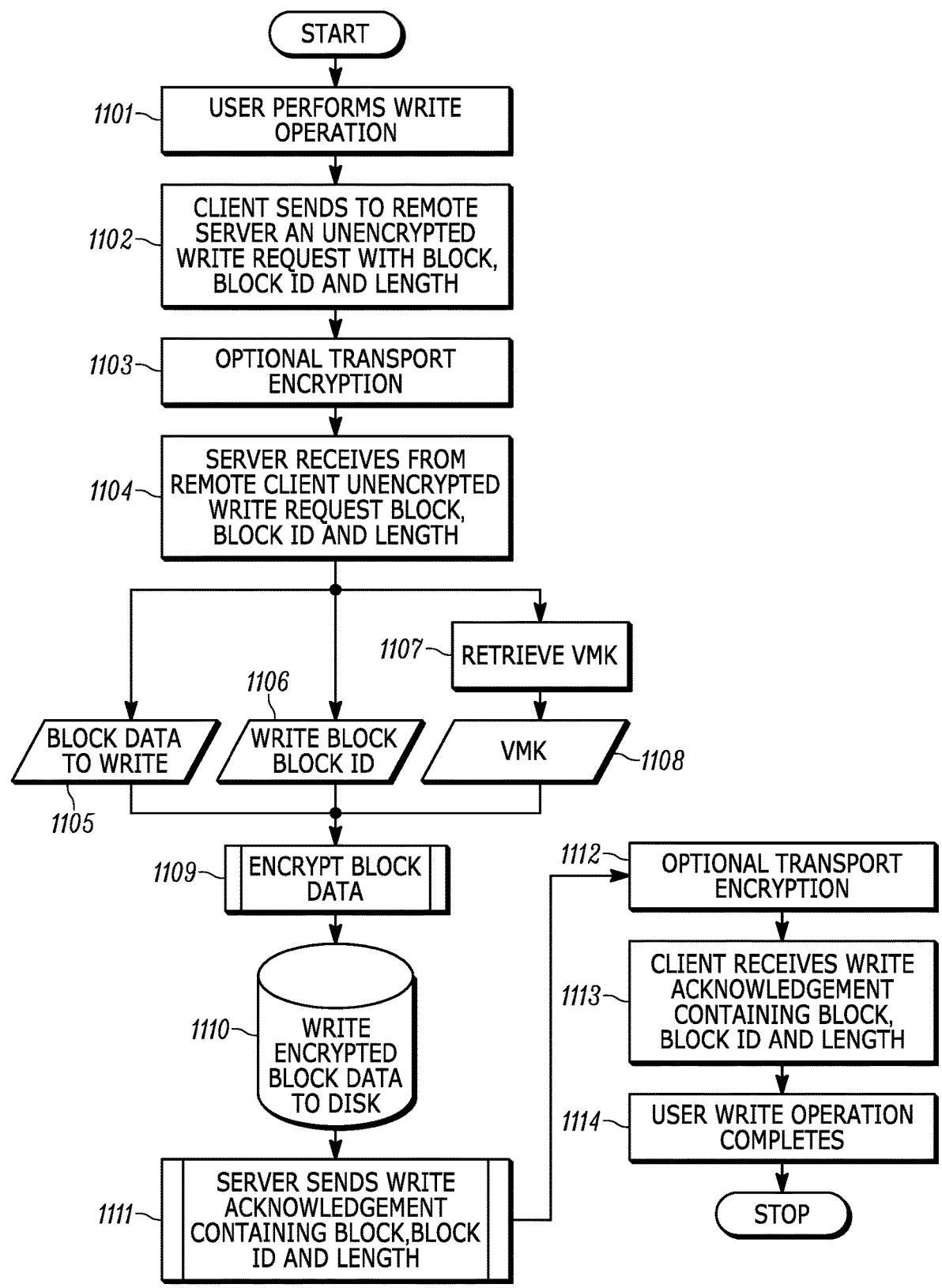
FIGS. 11(a) and 11(b) show how keys are used when writing and reading data over the network to and from a volume with server-only encryption.
Figure 11B:
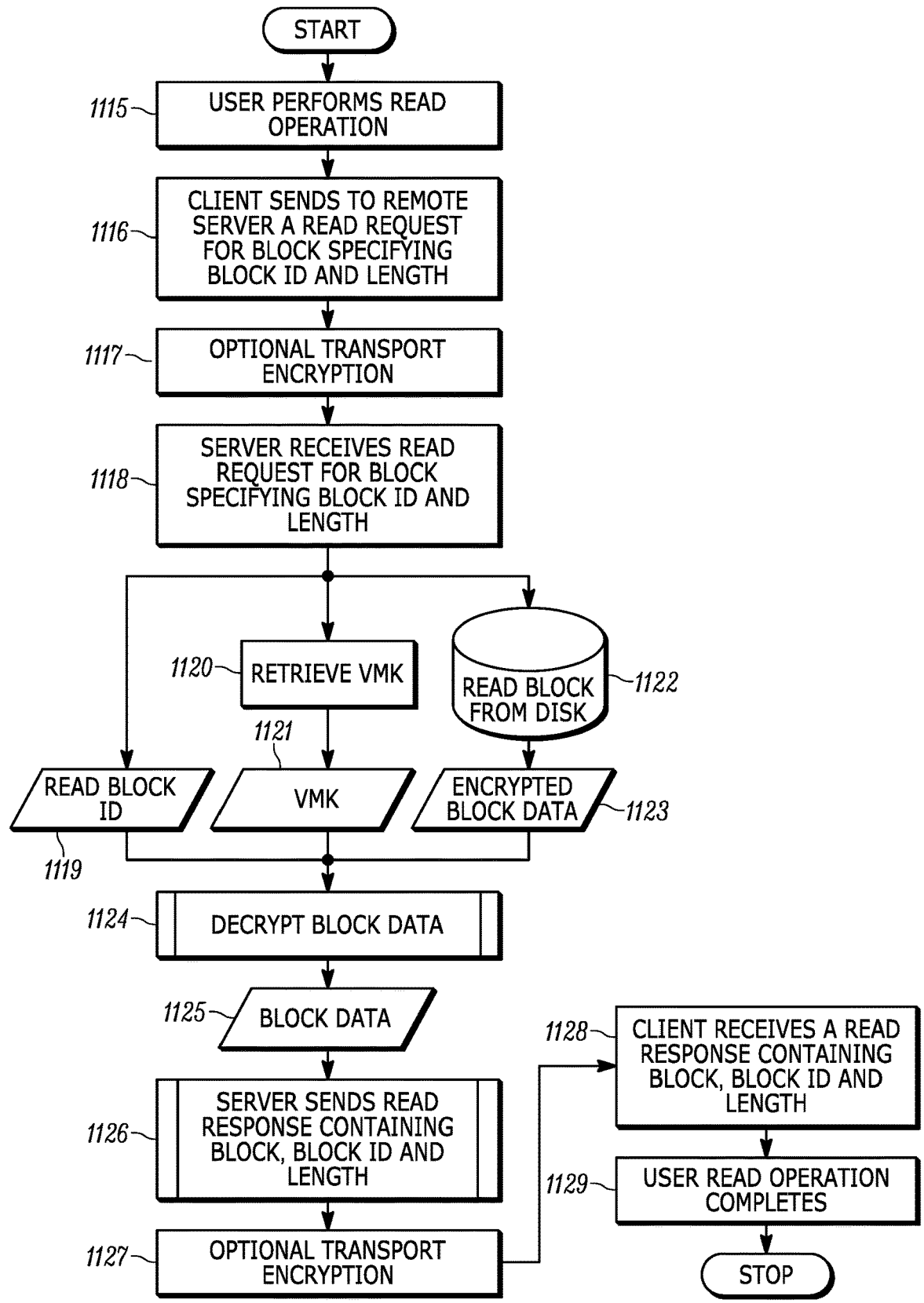

FIGS. 11(*a*) and 11(*b*) show and example of the networked read and write operations for Server-only encryption implementing the modes shown in FIGS. 1(*v*) and 1(*vi*). In these modes, Volume data are encrypted on the Server only; the client receives unencrypted data.

The data are optionally sent encrypted over the network [1103, 1112, 1117, 1127] depending on which mode is in operation.

For writing, the user performs the write operation [1101] on the Client system. The write is transmitted over the network [1102-1104], and then proceeds exactly as a write in FIG. 10—steps [1105-1110] correspond to steps [1002-1006]. The result is returned to the user across the network [1111-1113], and the write completes [1114].

For reading, the user performs the read operation [1115] on the Client system. The read is transmitted over the network [1116-1118], and then proceeds exactly as a read in FIG. 10—steps [1119-1125] correspond to steps [1009-1014]. The result is returned to the user across the network [1126-1128], and the read operation is completed [1129].

Networked Data Write and Read, Modes (vii) and (viii)

Figure 12A:
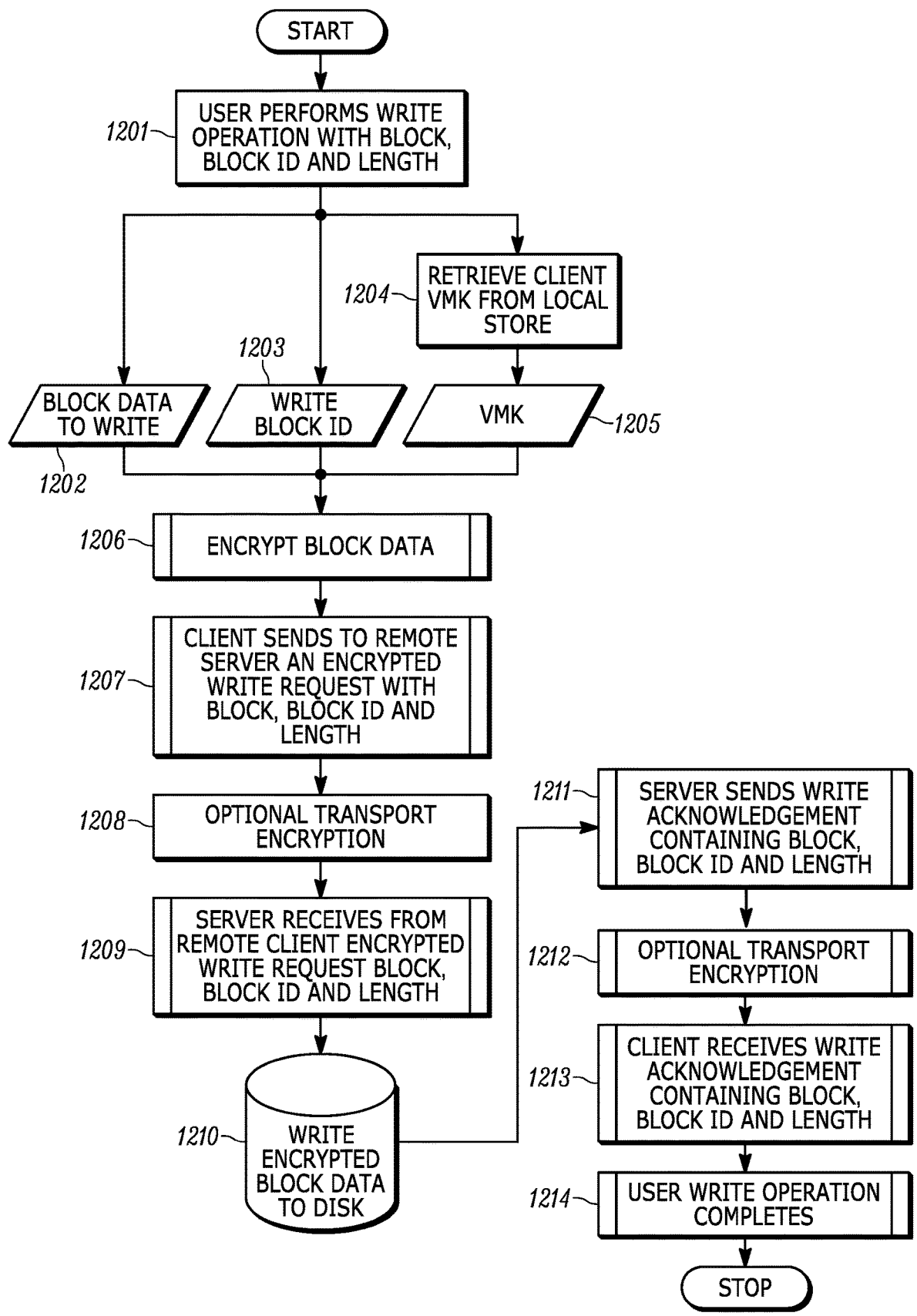
FIGS. 12(a) and 12(b) illustrate how keys are used when writing and reading data over the network to and from a volume with client-only encryption.
Figure 12B:
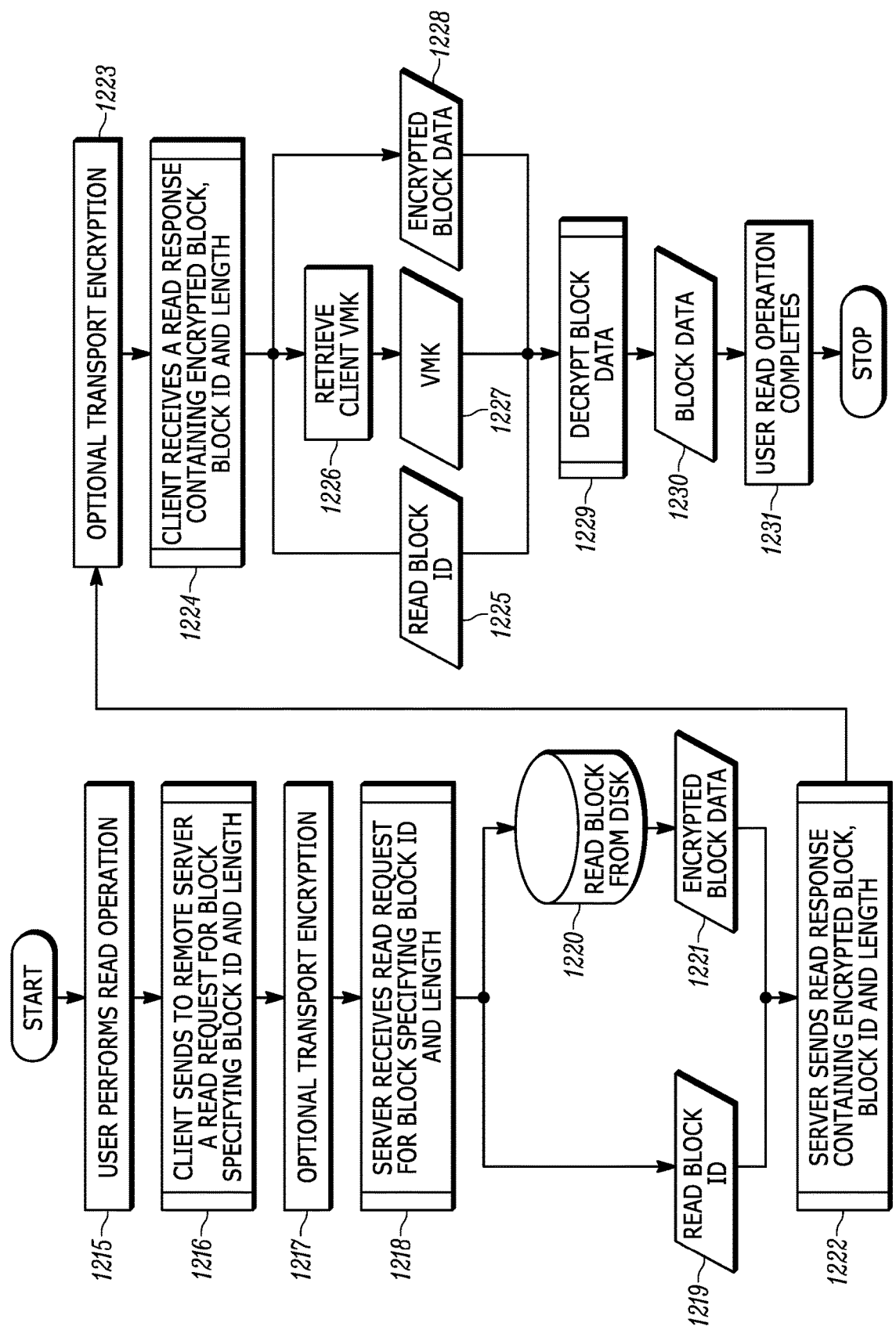

FIGS. 12(*a*) and 12(*b*) show an example of the networked read and write operations for Client-only encryption, implementing the modes shown in FIGS. 1(*vii*) and 1(*viii*).

Volume data are encrypted on the Client only, the server stores data in whatever form the Client sends but has no knowledge of its contents. The Server has no encryption-based controls over user access and can only allow or deny access based on criteria external to this disclosed technique, such as network access controls.

The data are optionally sent encrypted over the network [1208, 1212, 1217, 1223] depending on which mode is in operation.

For writing, the user performs the write operation [1201] on the Client system. Encryption of the data to be written proceeds as a write in FIG. 10—steps [1202-1206] correspond to steps [1002-1006]. The resulting encrypted data are sent over the network [1207-1209] and then written to disk [1210]. An acknowledgement is returned over the network [1211-1213], and the write completes [1214].

For reading, the user performs the read operation [1215] on the Client system. The read request is sent over the network [1216-1218]. The data identified by the block ID [1219] is read from the disk [1220,1221], and then returned to the client without further processing [1222-1224]. The data block is decrypted as in FIG. 10—steps [1225-1230] correspond to steps [1009-1014]. The decrypted block is returned to the user and the read completes [1231].

Networked Data Write and Read, Modes (ix) and (x)

Figure 13A:
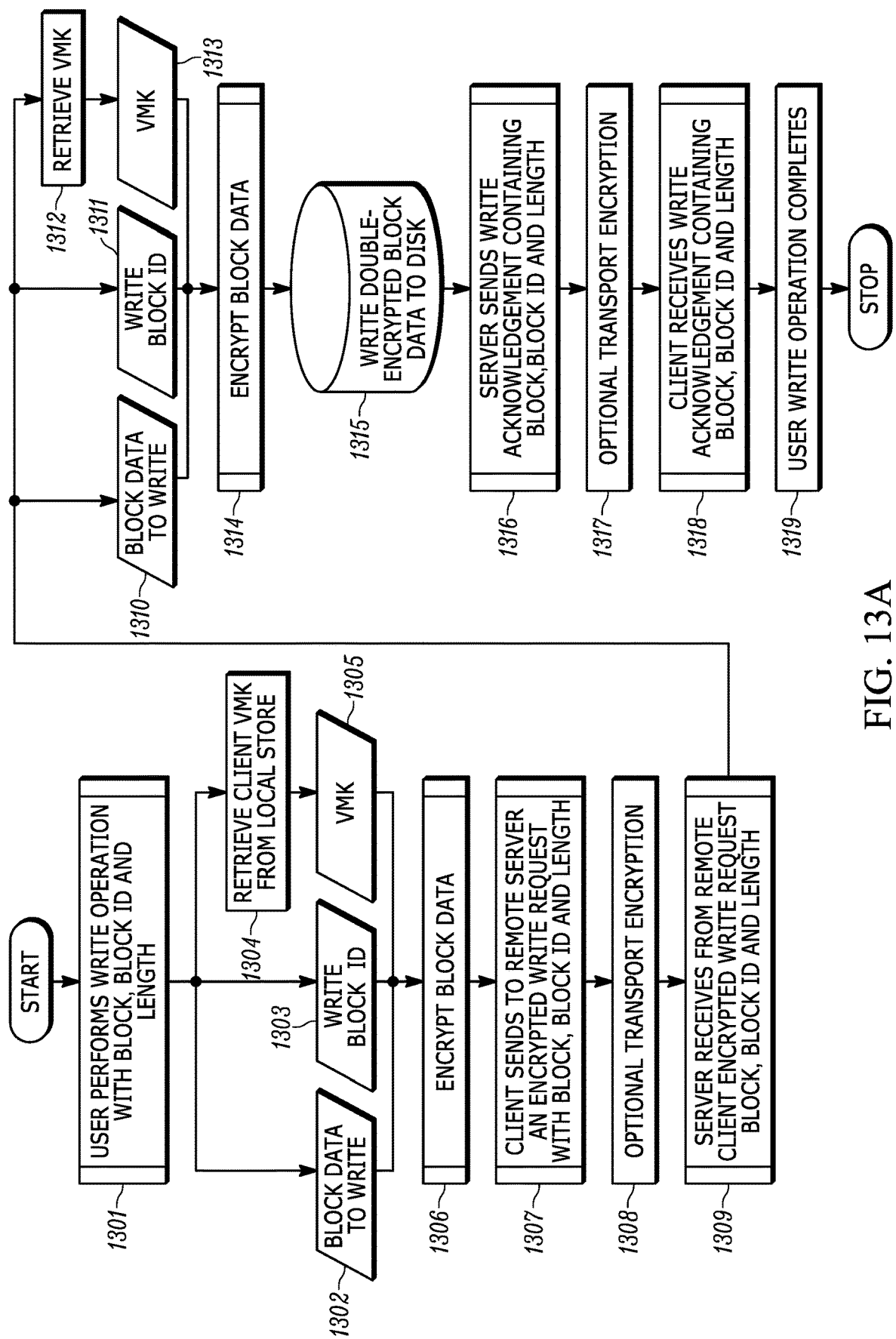
FIGS. 13(a) and 13(b) show how keys are used when writing and reading data over the network to and from a volume with both client- and server-based encryption.
Figure 13B:
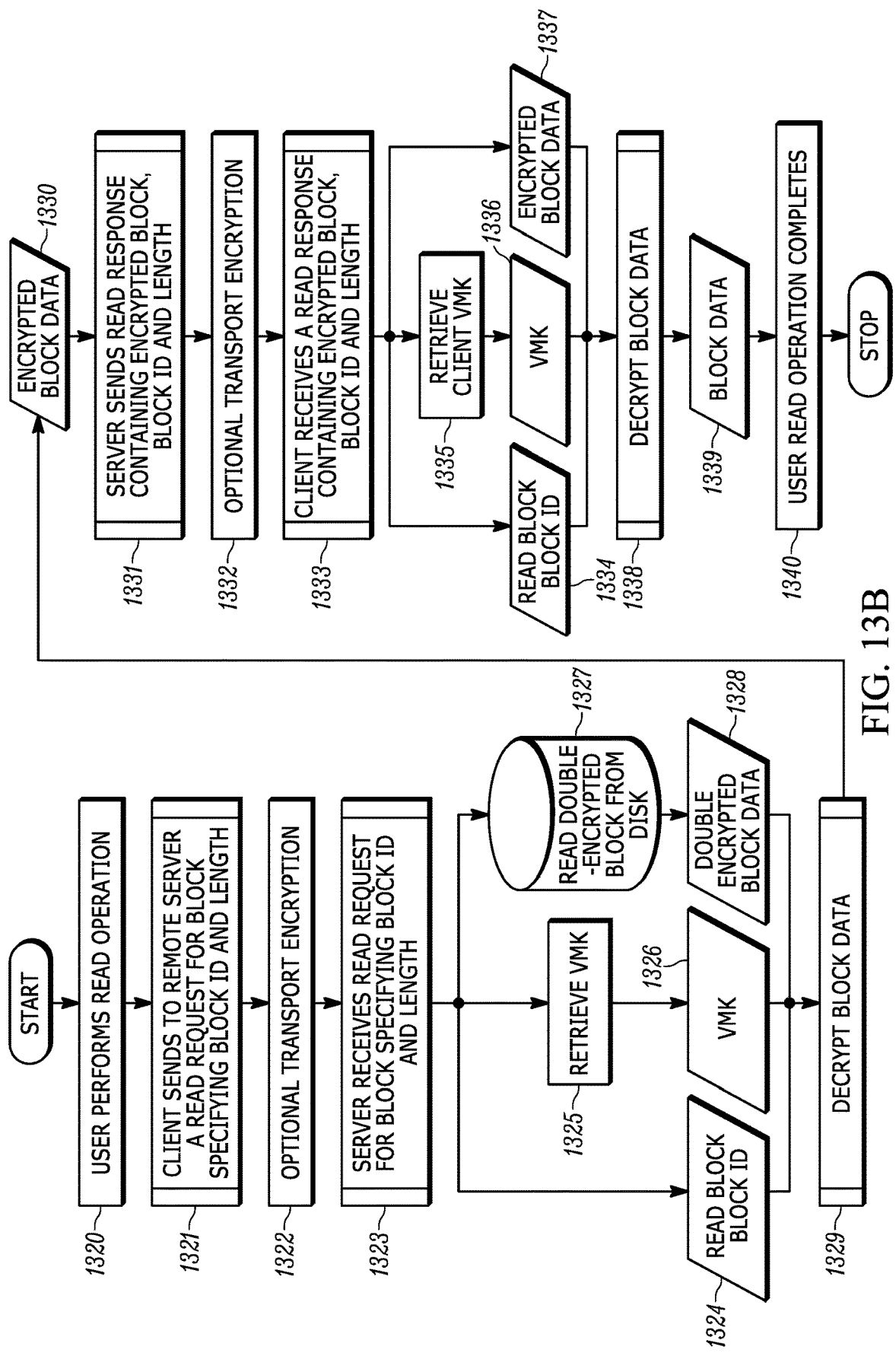

FIGS. 13(*a*) and 13(*b*) show an example of the network read and write operations for Client- and Server-based encryption, implementing the modes shown in FIGS. 1(*ix*) and 1(*x*). Volume data are encrypted by the Server using the same mechanism as modes (v) and (vi). In addition, the data sent and received by the Client are encrypted before transmission, and decrypted after transmission, by the Client.

There is no connection between the encryption User Key, User Volume Key and Master Volume Key on the Client and the Server; they may use the same User Key depending on policy, but may also use completely separate User Keys.

In these modes, the Server has cryptographic controls over the data stored on its Volumes, and may grant and revoke User Keys' access to volumes as it sees fit. However, the data it writes and subsequently reads are already encrypted by the Client, and it may (depending on policy) be impossible for the Server to read the unencrypted contents of the Volumes.

The data are optionally sent encrypted over the network [1308, 1317, 1322, 1332] depending on which mode is in operation.

For writing, the user performs the write operation [1301] on the Client system. The Client-side encryption of the data to be written proceeds as a write in FIG. 10—steps [1302-1306] correspond to steps [1002-1006]. The resulting encrypted data are sent to the Server over the network [1307-1309]. The Server-side encryption of the data to be written then also proceeds as a write in FIG. 10—steps [1310-1314] correspond to steps [1002-1006], but note that the Volume Master Key of step [1305] is different from the Volume Master Key of step [1313]. The encryption is performed in the same manner, but the keys are different.

The double-encrypted data are written to the disk [1315], and an acknowledgement is sent to the client over the network [1316-1318] and the write completes [1319].

For reading, the user performs the read operation [1320] on the Client system. The read request is sent over the network [1321-1323]. The Server-side decryption of the double-encrypted disk Volume proceeds as a read in FIG. 10—steps [1324-1330] correspond to steps [1009-1014]. The now singly-encrypted data are sent to the Client over the network [1331-1333]. The Client-side decryption of the data also proceeds as a read in FIG. 10—steps [1334-1339] correspond to steps [1009-1014]. The now decrypted data are returned to the Client [1340] and the read completes.

Recommendations for Use

For deployments requiring only security of data-at-rest, modes (iv) and (v) are sufficient. The choice of which of these modes to use is based on the relative location of Clients.

For deployments where only Transport Encryption is required, mode (iii) is sufficient.

For deployments where only data-at-rest and Transport Encryption is required, mode (vi) is recommended. Volumes are stored with encryption, and unencrypted data are not sent over the network.

For deployments where Client-based encryption is required and there is only a single user needing access to a Server volume, modes (vii) and (viii) are sufficient. Since the use of Client-based encryption indicates a lack of trust of the Server, mode (viii) is recommended as this leaks less unencrypted protocol data to potential attackers.

Finally, for deployments where Client-based encryption is required and multiple users may need to be granted access to a Server Volume, modes (ix) and (x) are required. As before, mode (x) is recommended to minimize leakage of unencrypted protocol information.

Various techniques for storing a data volume in, for example, persistent memory, are disclosed. In an embodiment, a method for encrypting data blocks on a managed storage device using a unique key is disclosed.

In an embodiment, the method includes the ability for a multiplicity of keys to be constructed so as to access to the decrypted data so stored.

In an embodiment, the method involves a mechanism for properly granting and revoking access to data via the multiplicity of keys in a distributed storage system.

In an embodiment, the method involves a mechanism for properly constructing individual data access keys from user passwords.

In an embodiment, the method involves a mechanism for properly distributing access to data via secure access tokens generated based on individual data access keys.

In an embodiment, the method involves a mechanism for properly creating new storage volumes protected by an individual key.

In an embodiment, the method involves a mechanism for extending the access to the data to a remote user.

In an embodiment, the method involves a mechanism for adding additional encryption to the data with additional keys, so as to deny the system where the data are physically stored access to the unencrypted form of the data.

A method for performing cryptography operations on data blocks within a volume of data is disclosed. The method involves generating a volume master key which is composed of random data and is stored in transient storage, generating a user key which is derived by processing a user password component known only to a user, and which is stored by the user in non-transient storage, generating a volume initialization vector which is stored at the storage system in non-transient storage and not known to the user, generating an intermediate key which is derived by combining a user supplied user key and the volume initialization vector which is supplied by the storage system, generating a user volume key, specific to a volume of data, which is generated by encrypting the volume master key with the intermediate key, and which is stored at the storage system in non-transient storage and is not known to the user, and performing cryptography operations on data blocks within an individual volume of data using the volume master key, the user key, the volume initialization vector, the intermediate key, and the user volume key.

In an embodiment, the method involves, at the storage system, receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, and performing cryptographic operations using the volume master key on data blocks received from the user and/or on data blocks sent to the user.

In an embodiment, the method involves generating multiple user volume keys linked to a single volume master key for the specific volume, wherein each user volume key is generated by encrypting the volume master key with the user intermediate key, and storing the generated user volume keys at the storage system in non-transient storage such that the user volume keys are not known to the users.

In an embodiment, the method involves removing the user volume key from the non-transient storage to prevent the computation of the volume master key for that individual user.

In an embodiment, the method involves removing the volume initialization vector for a specific volume from the non-transient storage to prevent the computation of the volume master key for all users.

In an embodiment, the method involves, at the storage system, receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, performing cryptographic operations using the volume master key on data blocks received from the user, and sending the data blocks on which the cryptographic operations were performed to a second storage system.

In an embodiment, the method involves, at the storage system, receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, performing cryptographic operations using the volume master key on data blocks received from a second storage system, and sending the data blocks on which the cryptographic operations were performed to the user.

In an embodiment, the steps of receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, and performing cryptographic operations using the volume master key on data blocks received from the user and/or on data blocks sent to the user are performed at a first storage system and the steps of receiving the user key of a user at the storage system, retrieving the user volume key associated with the user key, retrieving the volume initialization vector for a volume that is specified by the user, generating an intermediate key which is derived by combining the user key and the volume initialization vector, decrypting the user volume key with the derived intermediate key to retrieve the volume master key, and performing cryptographic operations using the volume master key on data blocks received from the user and/or on data blocks sent to the user are also performed at a second storage system, where the first storage system is connected to the second storage system by a network connection.

In an embodiment, a storage system will treat a volume of data as a single atomic unit, which has a set of attributes that may control the application of encoding of the data blocks in the volume. A storage system is typically not able to mix unencoded and encoded data within a single volume of data without having to maintain complex indexes of the data blocks, which would generate significant data capacity overhead as well as impact performance due to the maintenance of the indexes.

In an embodiment, the action of "persisting" data involves storing data such that the data will exist from session to session. Persistent data can be contrasted with transient data in which the data is lost from session to session. In an embodiment, persistent memory, which is used to "persist" data, involves data structures that are stored such that the data structures can continue to be accessed, by for example a computer application, using memory instructions or memory Application Programming Interfaces (APIs) even after the process that created (or last modified) the data has ended. In an embodiment, persisted data is stored on non-volatile memory such as a magnetic disk drive or a solid state drive (SSD). In an embodiment, persisted data is data that is stored such that the data exists outside of the application that created the data, such that the data can be recalled after the current instance of the application has been ended. In an embodiment, data is persisted when an application transfers the data to a storage system and provides mappings from the native programming language data structures of the application to date structures of the storage device.

As used herein, a computer application or application program may be a software program that runs on a computer and is the most common software on computers. Web browsers, e-mail programs, word processors, and databases are all example of computer applications.

As used herein, a file may be a collection of digital data stored in one unit, identified by a filename. The file can be a document, picture, audio or video stream, a data library, application, or another collection of data.

As used herein, a database may be a data structure that stores information and data that is organized to allow easy retrieval of the information. Typical databases contain multiple structures called tables, which may each include several different fields of data. For example, a company database may include tables for products, employees, and financial records. Each of the tables may have different fields that are relevant to the information stored in the table.

As used herein, a storage system may be a collection of computers, software applications, and storage devices that together operate to provide the persistence and retrieval of data from storage devices to and from computer applications and databases.

As used herein, a data block, a block of data, or simply a "block," is a sequence of bytes or bits, typically containing some whole number of records, that has a maximum length, e.g., a block size. The process of putting data into blocks is called blocking, while deblocking is the process of extracting data from blocks. Blocked data is normally stored in a data buffer and read or written a whole block at a time. Blocking can reduce the overhead in storage systems and can speed up the handling of a data-stream. Blocking is usually implemented when storing data to 9-track magnetic tape, to NAND flash memory, and to rotating media such as hard disks and optical disks. Most file systems are based on a block device, which provides a level of abstraction for the hardware responsible for storing and retrieving specified blocks of data, though the block size in file systems may be a multiple of the physical block size. Block storage is typically abstracted by the file system or database management system (DBMS) for use by computer applications and end users.

As used herein, a volume of data is a single accessible storage area with a single file system, typically, though not necessarily, residing on a single partition of a hard disk. In an embodiment, a volume of data can be different from a physical disk drive, however, the volume of data can be accessed with an operating system's logical interface. A volume of data is a logical representation of a number of data blocks, which data blocks are concatenated to form a larger set of data than can be stored as a group of data blocks. A volume of data is not the same as a partition in computer storage. For example, a floppy disk might be accessible as a volume, even though the floppy disk does not contain a partition, as floppy disks cannot be partitioned with most modern computer software. Furthermore, an operating system can recognize a partition without recognizing any volume associated with the partition, as when an operating system cannot interpret the filesystem stored there. Volumes of data exist at the logical operating system level while partitions exist at the physical, media specific level. Sometimes there is a one-to-one correspondence, but this is not a requirement. In Unix-like operating systems, volumes other than the boot volume have a mount-point somewhere within the filesystem, represented by a path. Logically, the directory tree stored on the volume is grafted in at the mountpoint. By convention, mount-points will often be placed in a directory called '/mnt', though '/media' and other terms are sometimes used. Files within a volume of data can generally be moved to any other place within that volume by manipulating the filesystem, without moving the actual data. However, if a file is to be moved outside the volume, the data itself must be relocated, which is a much more expensive operation.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given here but should be defined by the following claims and their full scope of equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 19:
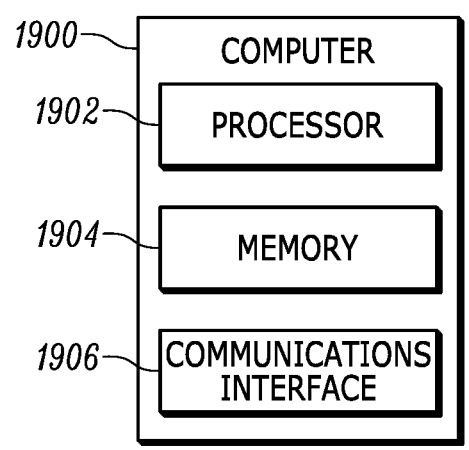
FIG. 19 depicts a computer that includes a processor, memory, and a communications interface.

In an embodiment, the above-described functionality is performed at least in part by a computer or computers, which executes computer readable instructions. FIG. 19 depicts a computer 1900 that includes a processor 1902, memory 1904, and a communications interface 1906. The processor may include a multifunction processor and/or an application-specific processor. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing cryptography operations on data blocks within a volume of data of a storage system, the method comprising:
   implementing a write operation from a client to a server over a network connection that involves:
   generating a client-side volume master key which is composed of random data and is stored in transient storage;
   generating a client-side user key which is derived by processing a client-side user password component known only to a client-side user, and which is stored by the client-side user in non-transient storage;
   generating a client-side volume initialization vector which is stored at the storage system in non-transient storage and not known to the client-side user;
   generating an client-side intermediate key which is derived by combining the client-side user key and the client-side volume initialization vector which is supplied by the storage system;
   generating a client-side user volume key, specific to the volume of data, which is generated by encrypting the client-side volume master key with the client-side intermediate key, and which is stored at the storage system in non-transient storage and is not known to the client-side user; and
   performing a volume master key recovery operation to recover the client-side volume master key that involves:
   receiving the client-side user key;
   retrieving the client-side user volume key associated with the client-side user key;
   retrieving the client-side volume initialization vector for the volume of data;
   generating the client-side intermediate key which is derived by combining the received client-side user key and the client-side volume initialization vector that was retrieved for the volume of data;
   decrypting the client-side user volume key with the client-side intermediate key that was generated by combining the received client-side user key and the client side volume initialization vector that was retrieved for the volume of data to recover the client-side volume master key; and
   encrypting the data blocks using the recovered client-side volume master key;
   transmitting the encrypted data blocks from the client to the server;
   generating a server-side volume master key which is composed of random data and is stored in transient storage, wherein the client-side volume master key is different from the server-side volume master key;
   generating a server-side user key which is derived by processing a server-side user password component known only to a server-side user, and which is stored by the server-side user in non-transient storage;
   generating a server-side volume initialization vector which is stored at the storage system in non-transient storage and not known to the server-side user;

generating a server-side intermediate key which is derived by combining the server-side user key and the server-side volume initialization vector which is supplied by the storage system;

generating a server-side user volume key, specific to the volume of data, which is generated by encrypting the server-side volume master key with the server-side intermediate key, and which is stored at the storage system in non-transient storage and is not known to the server-side user; and performing a volume master key recovery operation to recover the server-side volume master key that involves:
receiving the server-side user key;
retrieving the server-side user volume key associated with the server-side user key;
retrieving the server-side volume initialization vector for the volume of data;
generating the server-side intermediate key which is derived by combining the received server-side user key and the server-side volume initialization vector that was retrieved for the volume of data;
decrypting the server-side user volume key with the server-side intermediate key that was generated by combining the received server-side user key and the server-side volume initialization vector that was retrieved for the volume of data to recover the server-side volume master key; and encrypting the encrypted data blocks using the recovered server-side volume master key to generate double-encrypted data blocks;

writing the double-encrypted data blocks to memory at the server.

2. The method of claim 1 further comprising;
generating multiple user volume keys linked to a single volume master key for a specific volume, wherein each user volume key of the user volume keys is generated by encrypting the volume master key with a user-specific intermediate key, and storing the generated user volume keys at the storage system in non-transient storage such that the user volume keys are not known to users.

3. The method of claim 1 further comprising removing the client-side user volume key from the non-transient storage in which the client-side user volume key is stored to prevent computation of the client-side volume master key for the client-side user.

4. The method of claim 1 further comprising removing the client-side volume initialization vector for a specific volume from the non-transient storage in which the client-side volume initialization vector is stored to prevent computation of the client-side volume master key for all users.

5. The method of claim 1 further comprising:
implementing a read operation from the server to the client over the network connection that involves:
performing a volume master key recovery operation to recover the server-side volume master key that involves:
receiving the server-side user key;
retrieving the server-side user volume key associated with the server-side user key;
retrieving the server-side volume initialization vector for the volume of data;
generating the server-side intermediate key which is derived by combining the received server-side user key and the server-side volume initialization vector that was retrieved for the volume of data;

decrypting the server-side user volume key with the server-side intermediate key that was generated by combining the received server-side user key and the server-side volume initialization vector that was retrieved for the volume of data to recover the server-side volume master key; and reading the double-encrypted data blocks from a memory of the server;

decrypting the double-encrypted data blocks using the recovered server-side volume master key to generate the encrypted data blocks;

transmitting the encrypted data blocks to the client over the network connection;

performing a volume master key recovery operation to recover the client-side volume master key that involves:
receiving the client-side user key;
retrieving the client-side user volume key associated with the client-side user key;
retrieving the client-side volume initialization vector for the volume of data;
generating the client-side intermediate key which is derived by combining the received client-side user key and the client-side volume initialization vector that was retrieved for the volume of data;
decrypting the client-side user volume key with the client-side intermediate key that was generated by combining the received client-side user key and the client side volume initialization vector that was retrieved for the volume of data to recover the client side volume master key; and decrypting the encrypted data blocks using the recovered client-side volume master key;

providing the decrypted data blocks to the client.

6. A non-transitory computer readable medium that stores computer executable code, which when executed by one or more processors, implements a method for provisioning a volume of data of a storage system, the method comprising:
implementing a write operation from a client to a server over network connection that involves;
generating a client-side volume master key which is composed of random data and is stored in transient storage;
generating a client-side user key which is derived by processing a client-side user password component known only to a client-side user, and which is stored by the client-side user in non-transient storage;
generating a client-side volume initialization vector which is stored at the storage system in non-transient storage and not known to the client-side user;
generating at client-side intermediate key which is derived by combining the client-side user key and the client-side volume initialization vector which is supplied by the storage system;
generating a client-side user volume key, specific to the volume of data, which is generated by encrypting the client-side volume master key with the client-side intermediate key, and which is stored at the storage system in non-transient storage and is not known to the client-side user; and
performing a volume master key recovery operation to recover the client-side volume master key that involves:
receiving the client-side user key;
retrieving the client-side user volume key associated with the client-side user key;

retrieving the client-side volume initialization vector for the volume of data;

generating the client-side intermediate key which is derived by combining the received client-side user key and the client-side volume initialization vector that was retrieved for the volume of data;

decrypting the client-side user volume key with the client-side intermediate key that was generated by combining the received client-side user key and the client-side volume initialization vector that was retrieved for the volume of data to recover the client-side volume master key; and encrypting data blocks using the recovered client-side volume master key;

transmitting the encrypted data blocks from the client to the server;

generating a server-side volume master key which is composed of random data and is stored in transient storage, wherein the client-side volume master key is different from the server-side volume master key;

generating a server-side user key which is derived by processing a server-side user password component known only to a server-side user, and which is stored by the server-side user in non-transient storage;

generating a server-side volume initialization vector which is stored at the storage system in non-transient storage and not known to the server-side user;

generating a server-side intermediate key which is derived by combining the server-side user key and the server-side volume initialization vector which is supplied by the storage system;

generating a server-side user volume key, specific to the volume of data, which is generated by encrypting the server-side volume master key with the server-side intermediate key, and which is stored at the storage system in non-transient storage and is not known to the server-side user; and performing a volume master key recovery operation to recover the server-side volume master key that involves:
receiving the server-side user key;
retrieving the server-side user volume key associated with the server-side user key;
retrieving the server-side volume initialization vector for the volume of data;
generating the server-side intermediate key which is derived by combining the received server-side user key and the server-side volume initialization vector that was retrieved for the volume of data;
decrypting the server-side user volume key with the server-side intermediate key that was generated by combining the received server-side user key and the server-side volume initialization vector that was retrieved for the volume of data to recover the server-side volume master key; and encrypting the encrypted data blocks using the recovered server-side volume master key to generate double-encrypted data blocks;

writing the double-encrypted data blocks to memory at the server.

7. The non-transitory computer readable medium of claim 6 further comprising:
generating multiple user volume keys linked to a single volume master key for a specific volume, wherein each user volume key of the user volume keys is generated by encrypting the volume master key with a user-specified intermediate key, and storing the generated user volume keys at the storage system in non-transient storage such that the user volume keys are not known to users.

8. The non-transitory computer readable medium of claim 6 further comprising removing the client-side user volume key from the non-transient storage in which the client-side user volume key is stored to prevent computation of the client-side volume master key for the client-side user.

9. The non-transitory computer readable medium of claim 6 further comprising removing the client-side volume initialization vector for a specific volume from the non-transient storage in which the client-side volume initialization vector is stored to prevent computation of the client-side volume master key for all users.

10. The non-transitory computer readable medium of claim 6 further comprising:
implementing a read operation from the server to the client over the network connection that involves:
performing a volume master key recovery operation to recover the server-side volume master key that involves:
receiving the server-side user key;
retrieving the server-side user volume key associated with the server-side user key;
retrieving the server-side volume initialization vector for the volume of data;
generating the server-side intermediate key which is derived by combining the received server-side user key and the server-side volume initialization vector that was retrieved for the volume of data;
decrypting the server-side user volume key with the server-side intermediate key that was generated by combining the received server-side user key and the server-side volume initialization vector that was retrieved for the volume of data to recover the server-side volume master key; and
reading the double-encrypted data blocks from a memory of the server;
decrypting the double-encrypted data blocks using the recovered server-side volume master key to generate the encrypted data blocks;
transmitting the encrypted data blocks to the client over the network connection;
performing a volume master key recovery operation to recover the client-side volume master key that involves:
receiving the client-side user key;
retrieving the client-side user volume key associated with the client-side user key;
retrieving the client-side volume initialization vector for the volume of data;
generating the client-side intermediate key which is derived by combining the received client-side user key and the client-side volume initialization vector that was retrieved for the volume of data;
decrypting the client-side user volume key with the client-side intermediate key that was generated by combining the received client-side user key and the client side volume initialization vector that was retrieved for the volume of data to recover the client-side volume master key; and
decrypting the encrypted data blocks using the recovered client-side volume master key;
providing the decrypted data blocks to the client.

11. A method for performing cryptography operations on data blocks within a volume of data of a storage system, the method comprising:

implementing a read operation from a server to a client over a network connection that involves:

generating a server-side volume master key which is composed of random data and is stored in transient storage;

generating a server-side user key which is derived by processing a server-side user password component known only to a server-side user, and which is stored by the server-side user in non-transient storage;

generating a server-side volume initialization vector which is stored at the storage system in non-transient storage and not known to the server-side user;

generating a server-side intermediate key which is derived by combining the server-side user key and the server-side volume initialization vector which is supplied by the storage system;

generating a server-side user volume key, specific to the volume of data, which is generated by encrypting the server-side volume master key with the server-side intermediate key, and which is stored at the storage system in non-transient storage and is not known to the server-side user; and performing a volume master key recovery operation to recover the server-side volume master key that involves:

receiving the server-side user key;

retrieving the server-side user volume key associated with the server-side user key;

retrieving the server-side volume initialization vector for the volume of data;

generating the server-side intermediate key which is derived by combining the received server-side user key and the server-side volume initialization vector that was retrieved for the volume of data;

decrypting the server-side user volume key with the server-side intermediate key that was generated by combining the received server-side user key and the server-side volume initialization vector to recover the server-side volume master key; and reading double-encrypted data blocks from a memory of the server;

decrypting the double-encrypted data blocks using the server-side volume master key to generate encrypted data blocks;

transmitting the encrypted data blocks to the client over the network connection;

generating a client-side volume master key which is composed of random data and is stored in transient storage, wherein the client-side volume master key is different from the server-side volume master key;

generating a client-side user key which is derived by processing a client-side user password component known only to a client-side user, and which is stored by the client-side user in non-transient storage;

generating a client-side volume initialization vector which is stored at the storage system in non-transient storage and not known to the client-side user;

generating a client-side intermediate key which is derived by combining the client-side user key and the client-side volume initialization vector which is supplied by the storage system;

generating a client-side user volume key, specific to the volume of data, which is generated by encrypting the client-side volume master key with the client-side intermediate key, and which is stored at the storage system in non-transient storage and is not known to the client-side user; and performing a volume master key recovery operation to recover the client-side volume master key that involve:

receiving the client-side user key;

retrieving the client-side user volume key associated with the client-side user key;

retrieving the client-side volume initialization vector for the volume of data;

generating the client-side intermediate key which is derived by combining the received client-side user key and the client-side volume initialization vector that was retrieved for the volume of data;

decrypting the client-side user volume key with the client-side intermediate key that was generated by combining the received client-side user key and the client side volume initialization vector that was retrieved for the volume of data to recover the client-side volume master key; and decrypting the encrypted data blocks using the recovered client-side volume master key;

providing the decrypted data blocks to the client.

\* \* \* \* \*